United States Patent
Sano et al.

(10) Patent No.: US 7,177,517 B2
(45) Date of Patent: Feb. 13, 2007

(54) OPTICAL WAVE GUIDE AND THE METHOD OF PROPAGATING LIGHT USING THE SAME

(75) Inventors: Akihiko Sano, Joyo (JP); Shuichi Misuimi, Nara (JP); Akihiko Hatamura, Uji (JP); Naru Yasuda, Uji (JP); Hayami Hosokawa, Tsuzuki-gun (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/058,639

(22) Filed: Feb. 15, 2005

(65) Prior Publication Data

US 2005/0180714 A1 Aug. 18, 2005

(30) Foreign Application Priority Data

Feb. 16, 2004 (JP) .............................. 2004-039090

(51) Int. Cl.
G02B 6/10 (2006.01)
G02B 6/26 (2006.01)

(52) U.S. Cl. ....................................... 385/132; 385/50
(58) Field of Classification Search ..................... None
See application file for complete search history.

(56) References Cited

U.S. PATENT DOCUMENTS

| 3,936,142 | A | * | 2/1976 | Kersten ........................ 385/39 |
| 5,018,811 | A | | 5/1991 | Haavisto et al. |
| 5,703,989 | A | | 12/1997 | Khan et al. |
| 6,760,529 | B2 | * | 7/2004 | Chong et al. ................ 385/129 |
| 6,950,588 | B2 | * | 9/2005 | Terakawa et al. ............ 385/129 |
| 2001/0026670 | A1 | * | 10/2001 | Takizawa et al. ............ 385/129 |
| 2003/0012493 | A1 | | 1/2003 | Lee et al. |
| 2003/0026569 | A1 | | 2/2003 | Eldada et al. |
| 2004/0234224 | A1 | * | 11/2004 | Ishizaki et al. ............. 385/129 |
| 2005/0117865 | A1 | * | 6/2005 | Ishikawa ..................... 385/129 |

FOREIGN PATENT DOCUMENTS

| JP | 5-313034 | 11/1993 |
| JP | 2003-43286 | 2/2003 |

(Continued)

OTHER PUBLICATIONS

Q. Weiping et al., Modal Analysis of a Rib Optical Waveguide with Trapezoidal Cross-section by a Variable Transformed Galerkin Method, Computational Electromagnetics and its Applications, 1999. Proceedings (ICCEA '99), pp. 82-85.*

(Continued)

*Primary Examiner*—Rodney Bovernick
*Assistant Examiner*—Omar Rojas
(74) *Attorney, Agent, or Firm*—Osha Liang LLP

(57) ABSTRACT

In the upper face of a lower clad layer, a core trench is formed having a cross-sectional trapezoidal shape having a narrow bottom face and a wide upper face, a core is formed within the core trench, and an upper clad layer is formed at the upper face of the core for sealing. The bottom face of the core trench becomes a low refractive index layer having a refractive index smaller than the lower clad layer. The substantive difference of refractive index between the core and the lower clad layer is thus increased.

8 Claims, 24 Drawing Sheets

FOREIGN PATENT DOCUMENTS

JP  2003-121670  4/2003

OTHER PUBLICATIONS

Patent Abstracts of Japan; Publication No. 05-313034 dated Nov. 26, 1993 (2 pages).

Patent Abstracts of Japan; Publication No. 2003-043286 dated Feb. 13, 2003 (2 pages).

Patent Abstracts of Japan; Publication No. 2003-121670 dated Apr. 23, 2003 (2 pages).

European Search Report for European Application No.: EP 05 10 1126 mailed on Jun. 2, 2005, 4 pages.

* cited by examiner

[Figure 1]
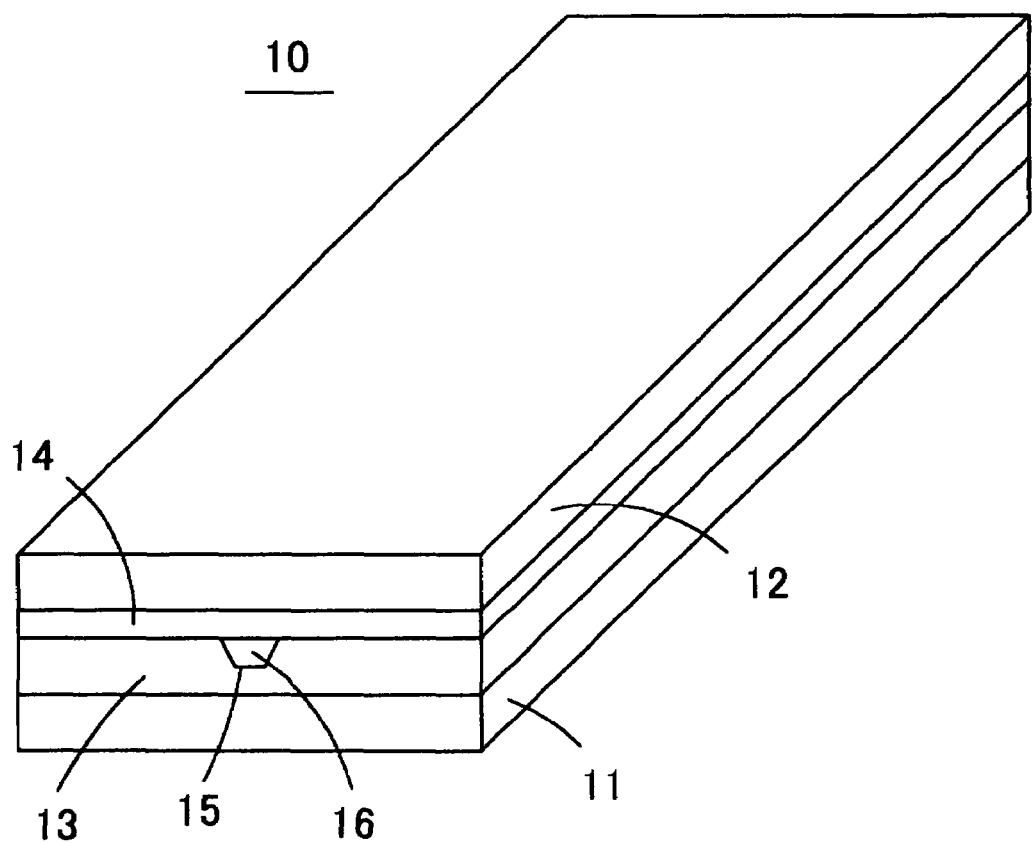

[Figure 2]
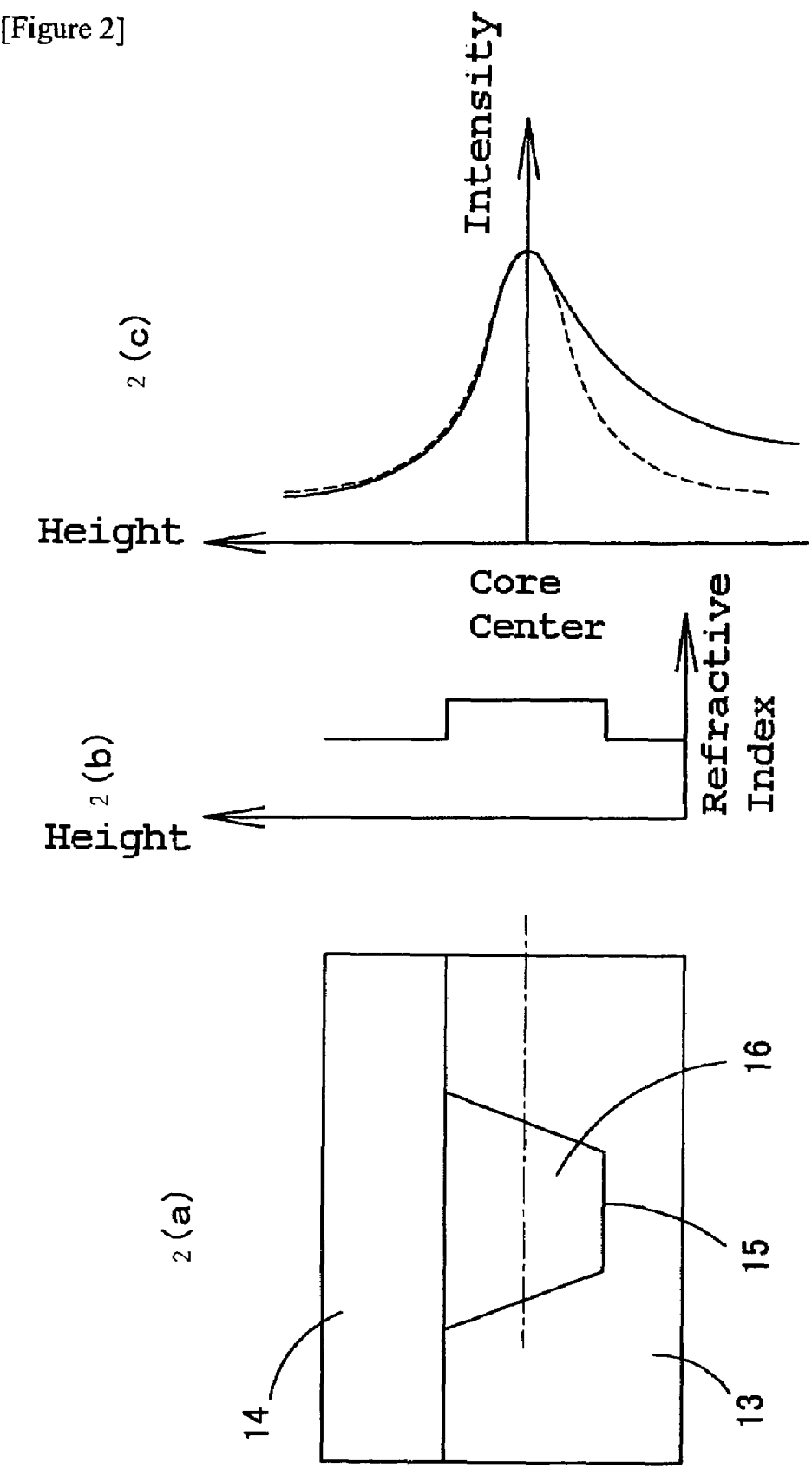

[Figure 3]
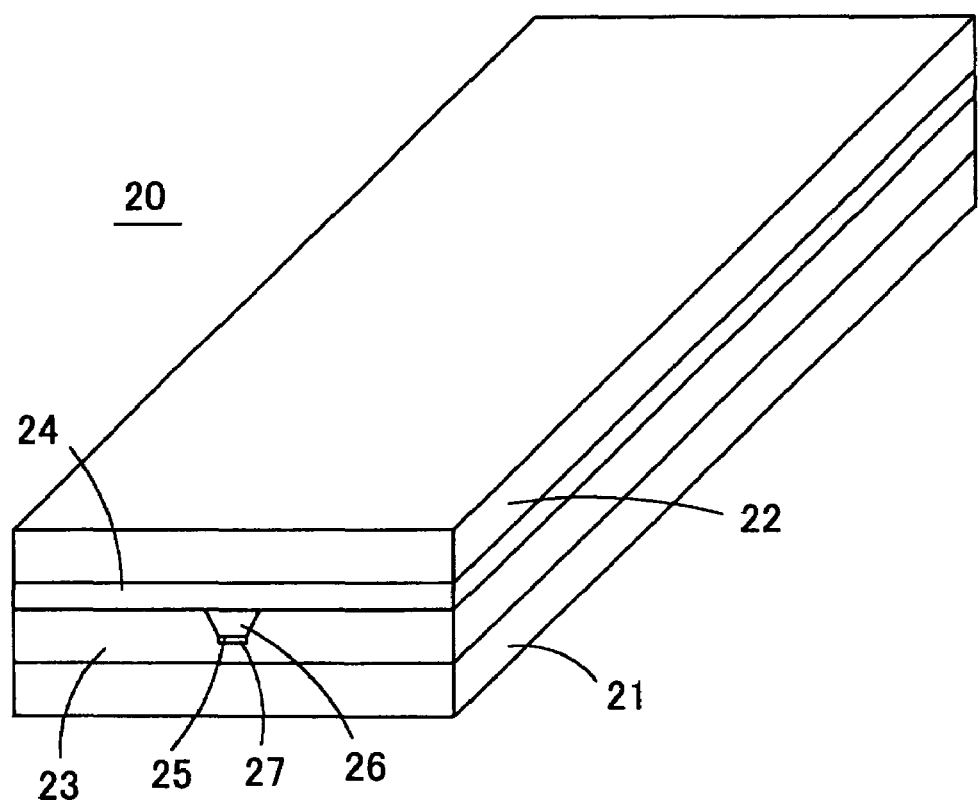

[Figure 4]
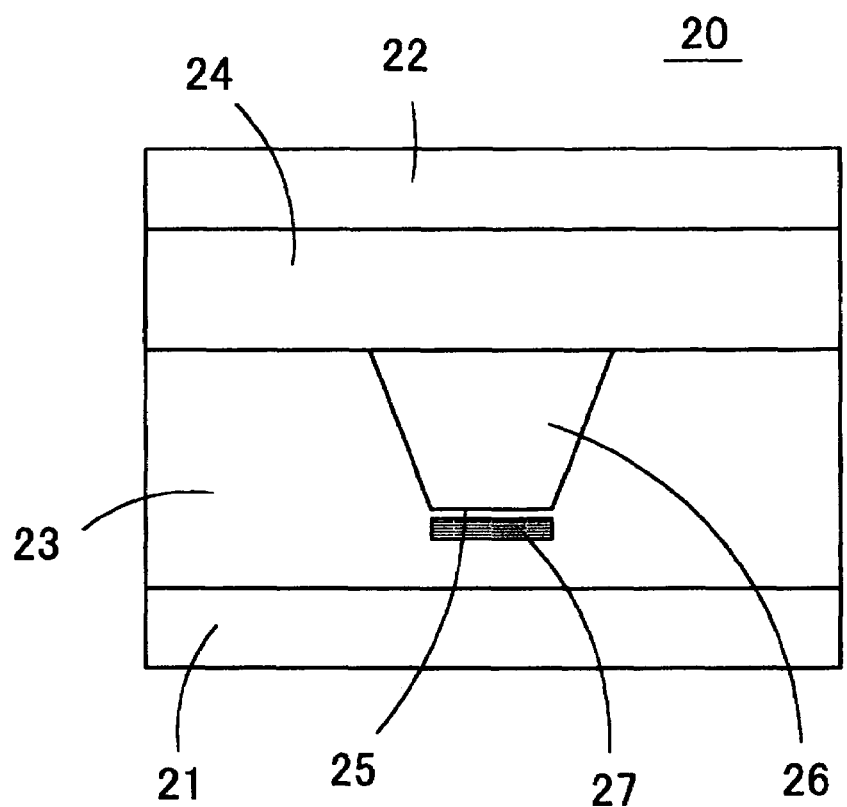

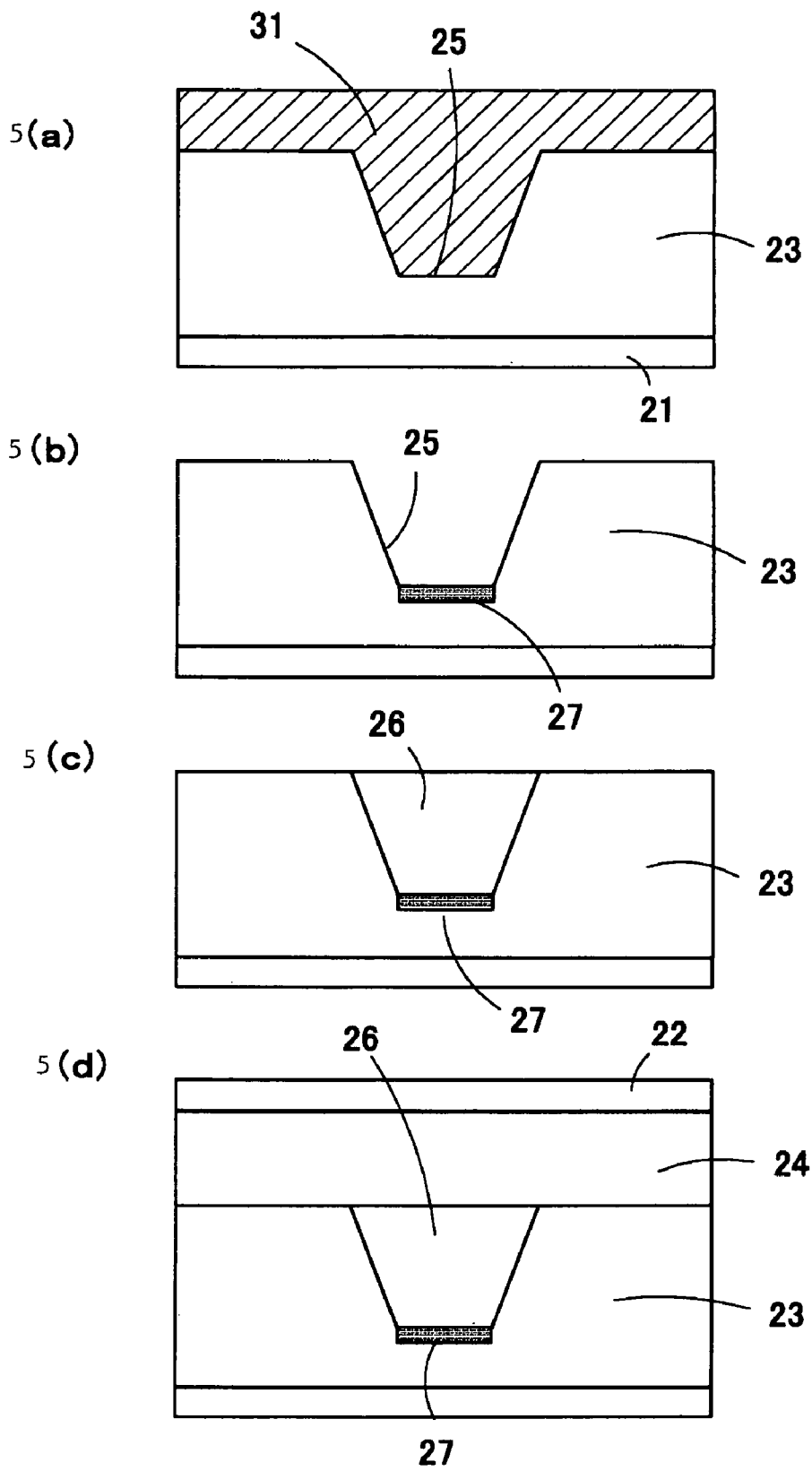
[Figure 5]

[Figure 6]
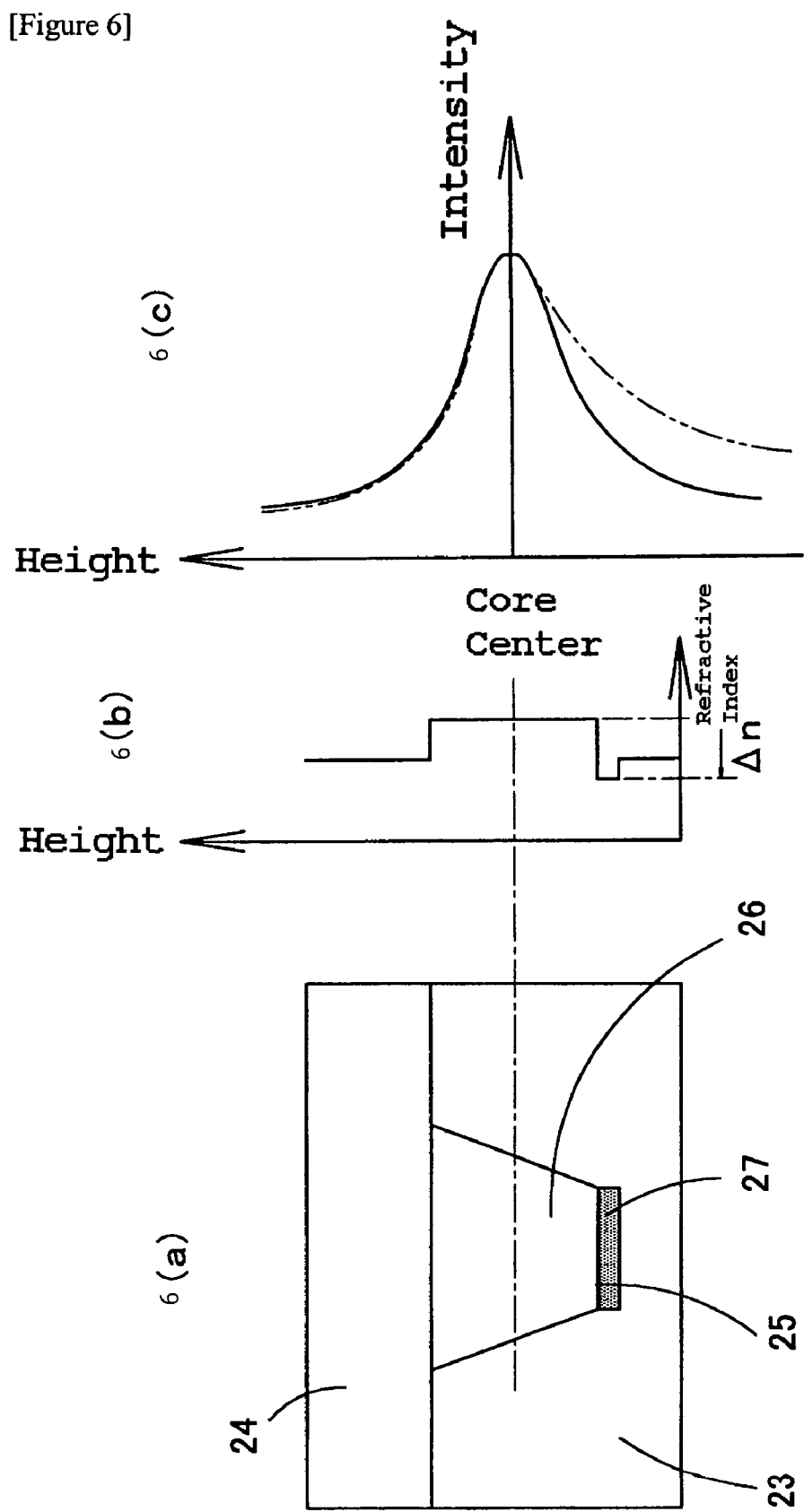

[Figure 7]
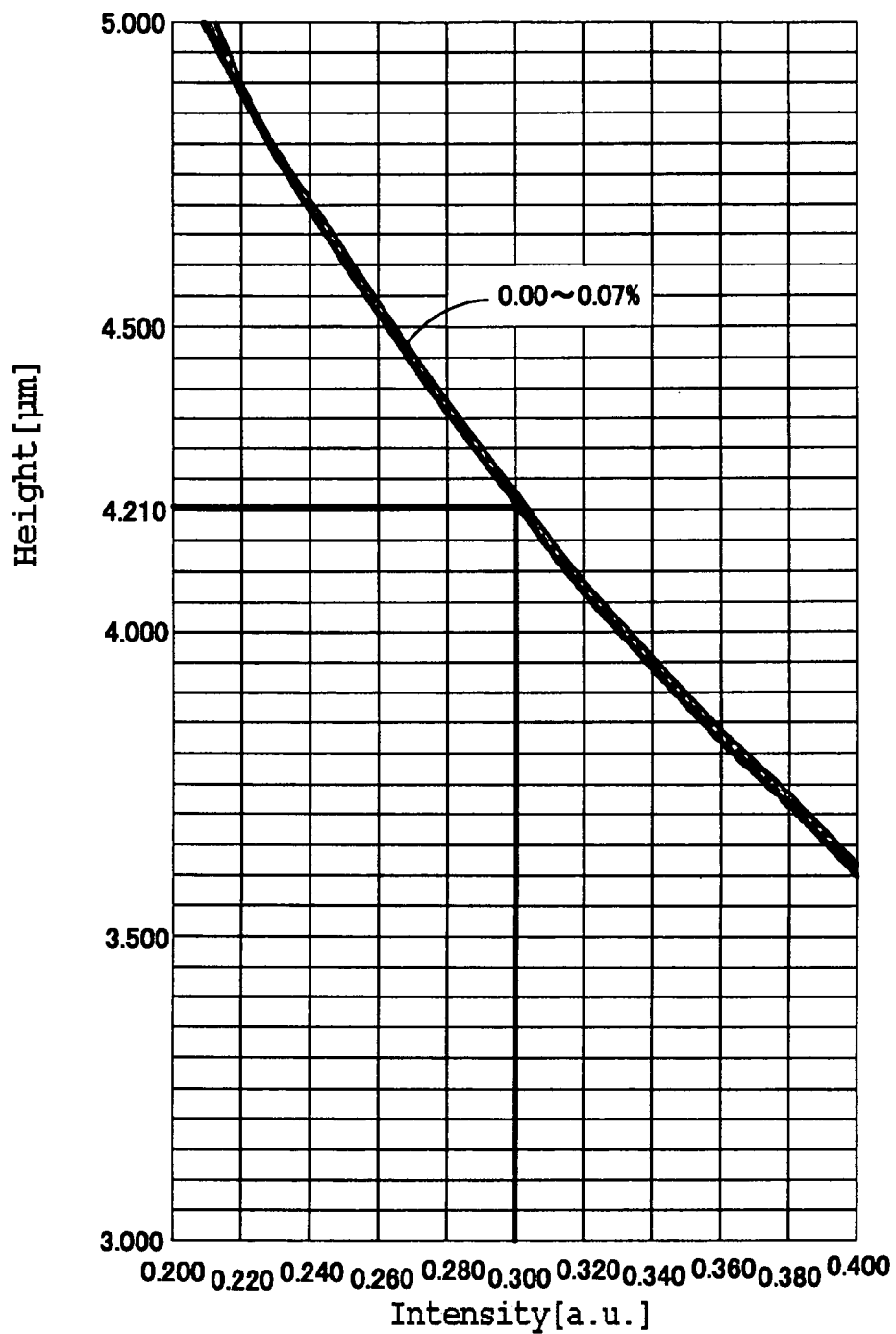

[Figure 8]
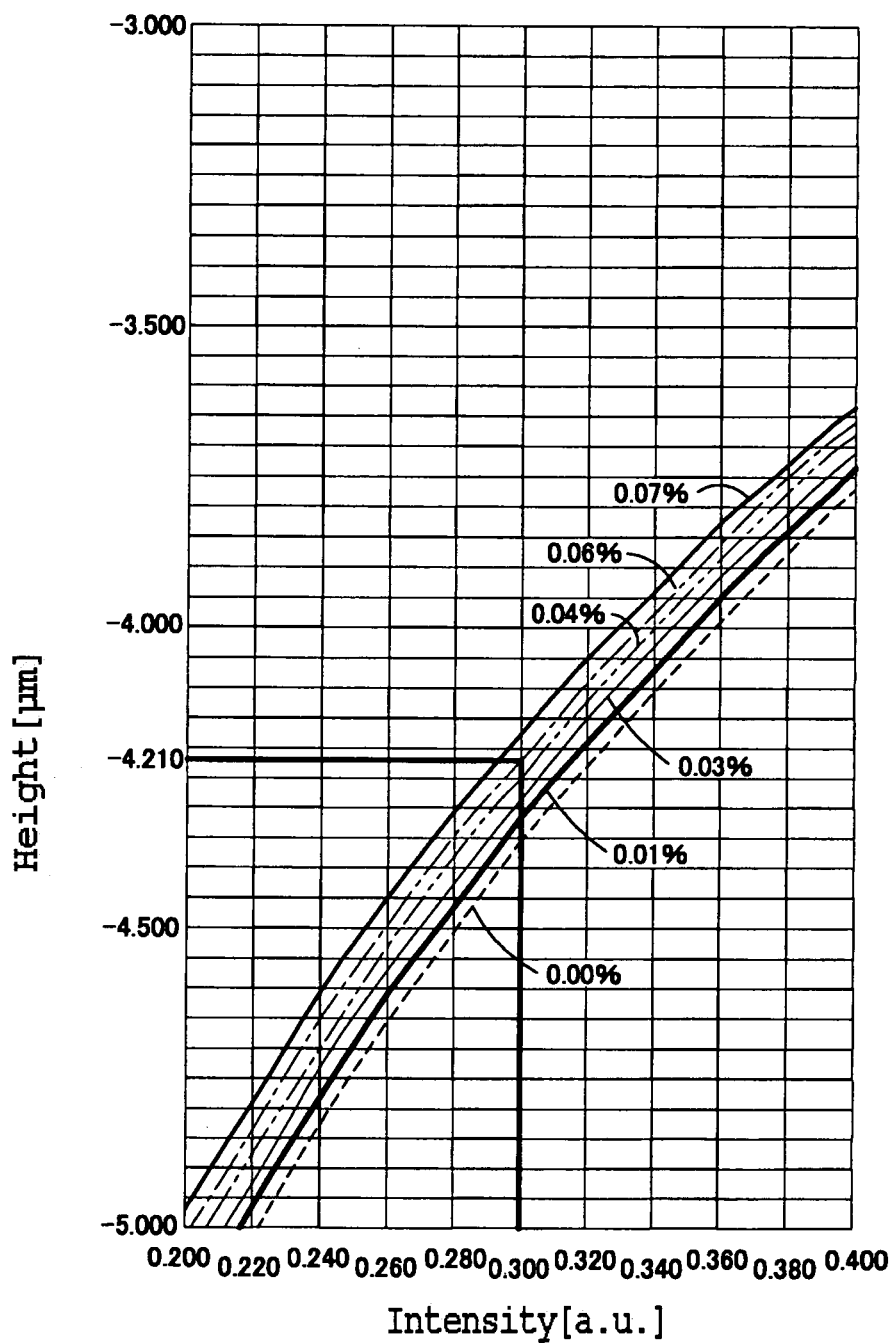

[Figure 9]
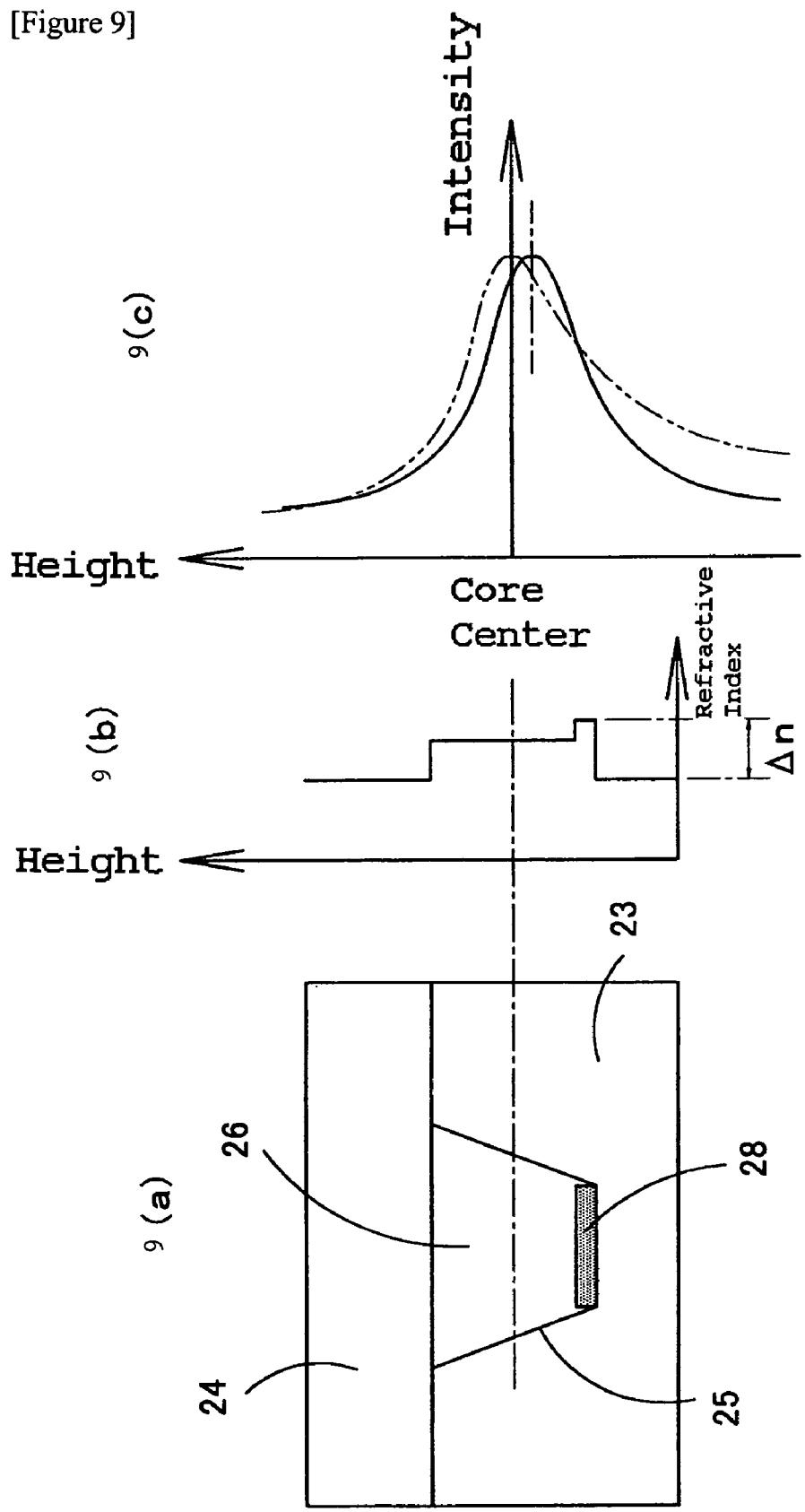

[Figure 10]
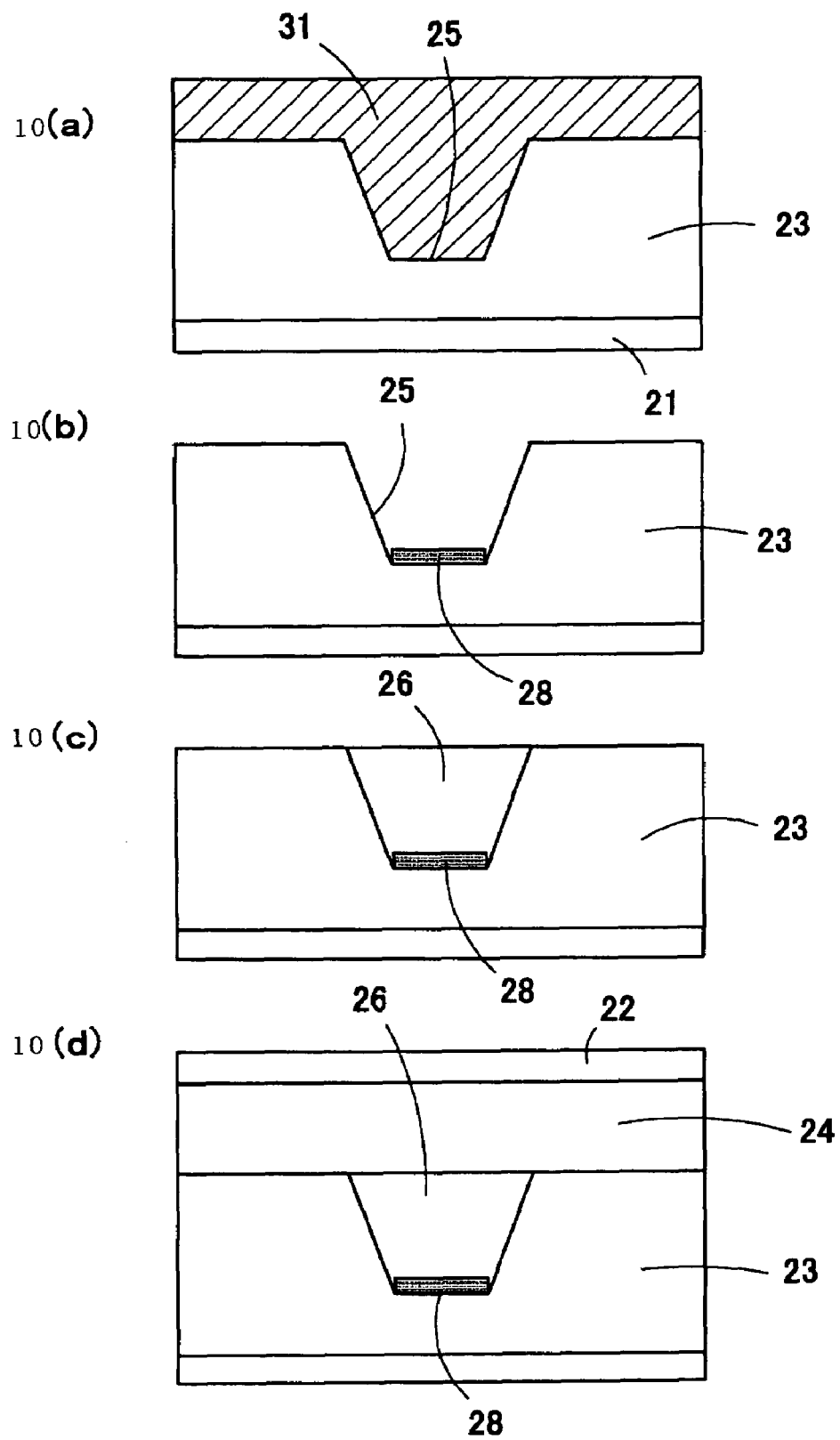

[Figure 11]
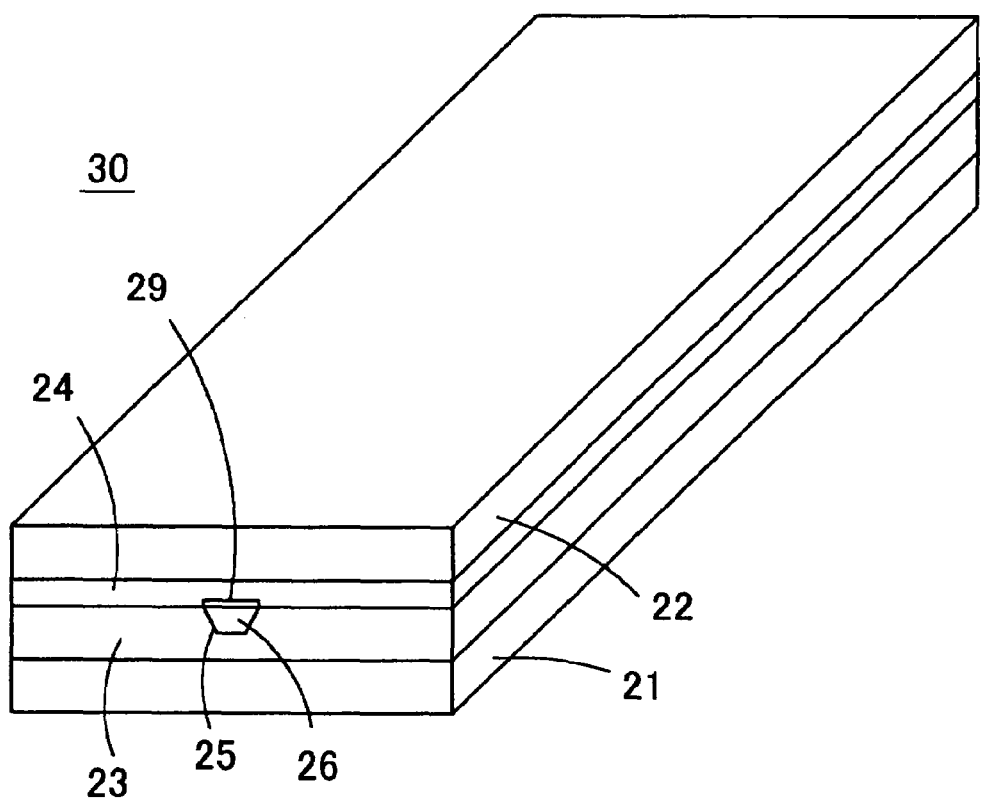

[Figure 12]
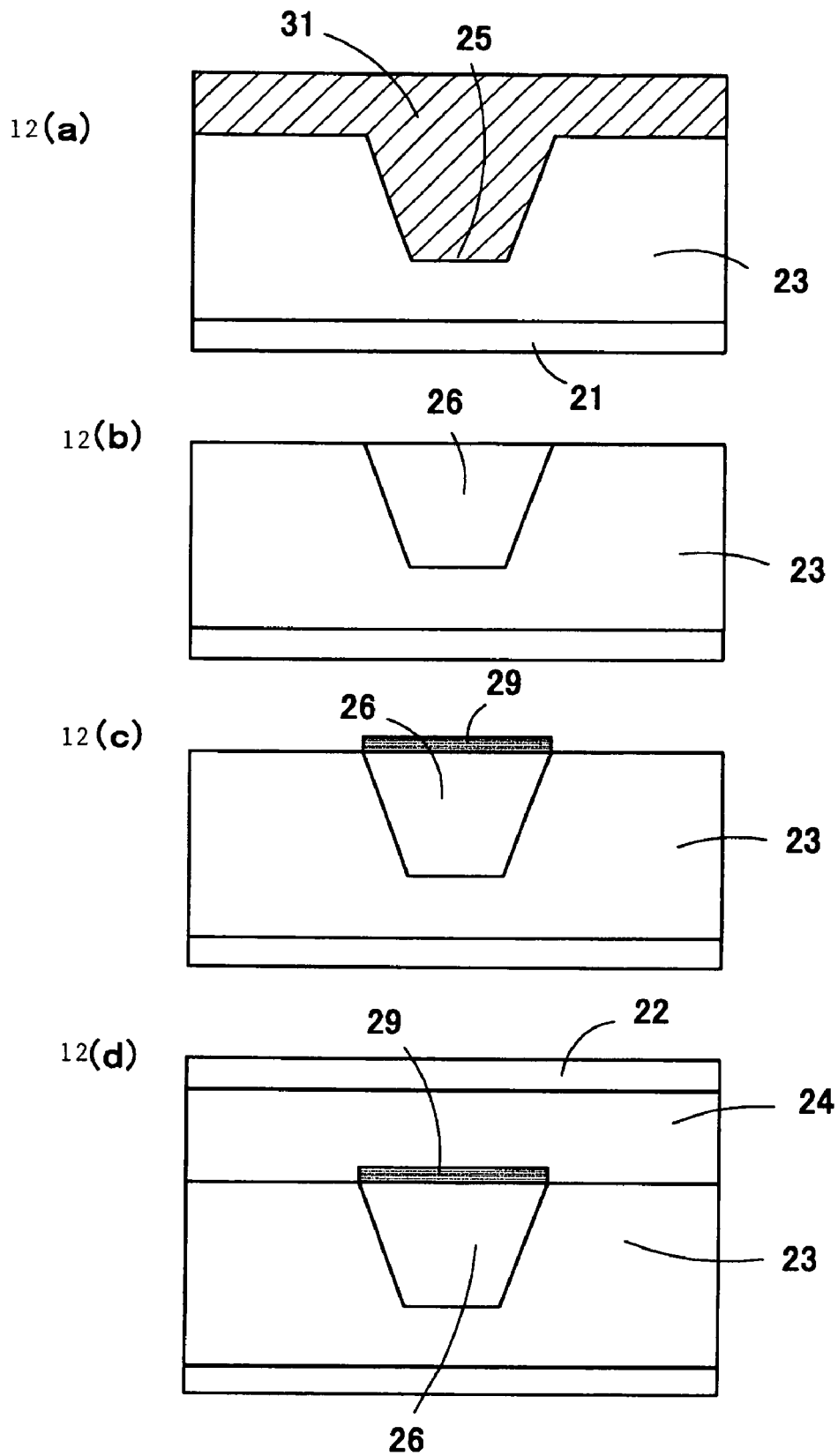

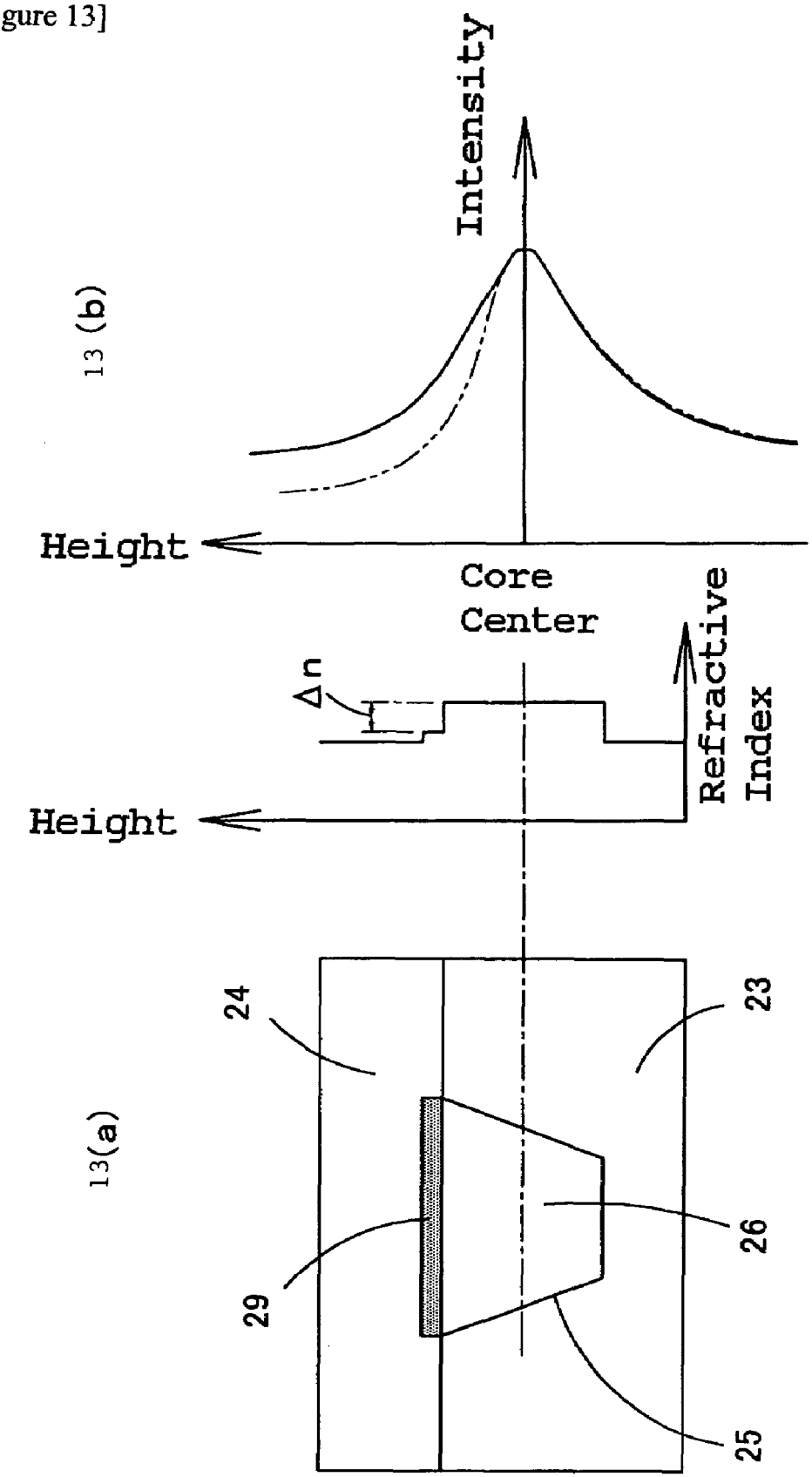
[Figure 13]

[Figure 14]
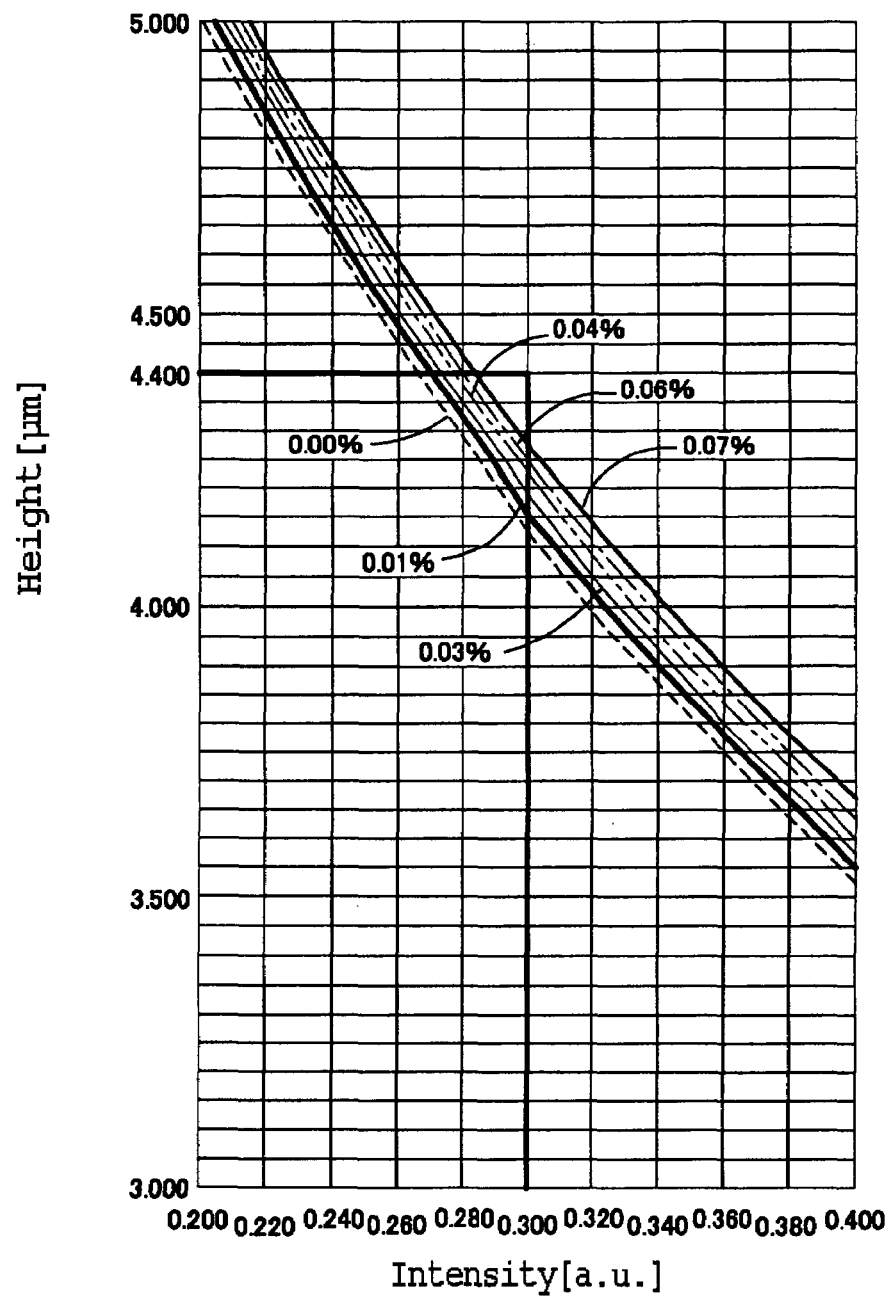

[Figure 15]
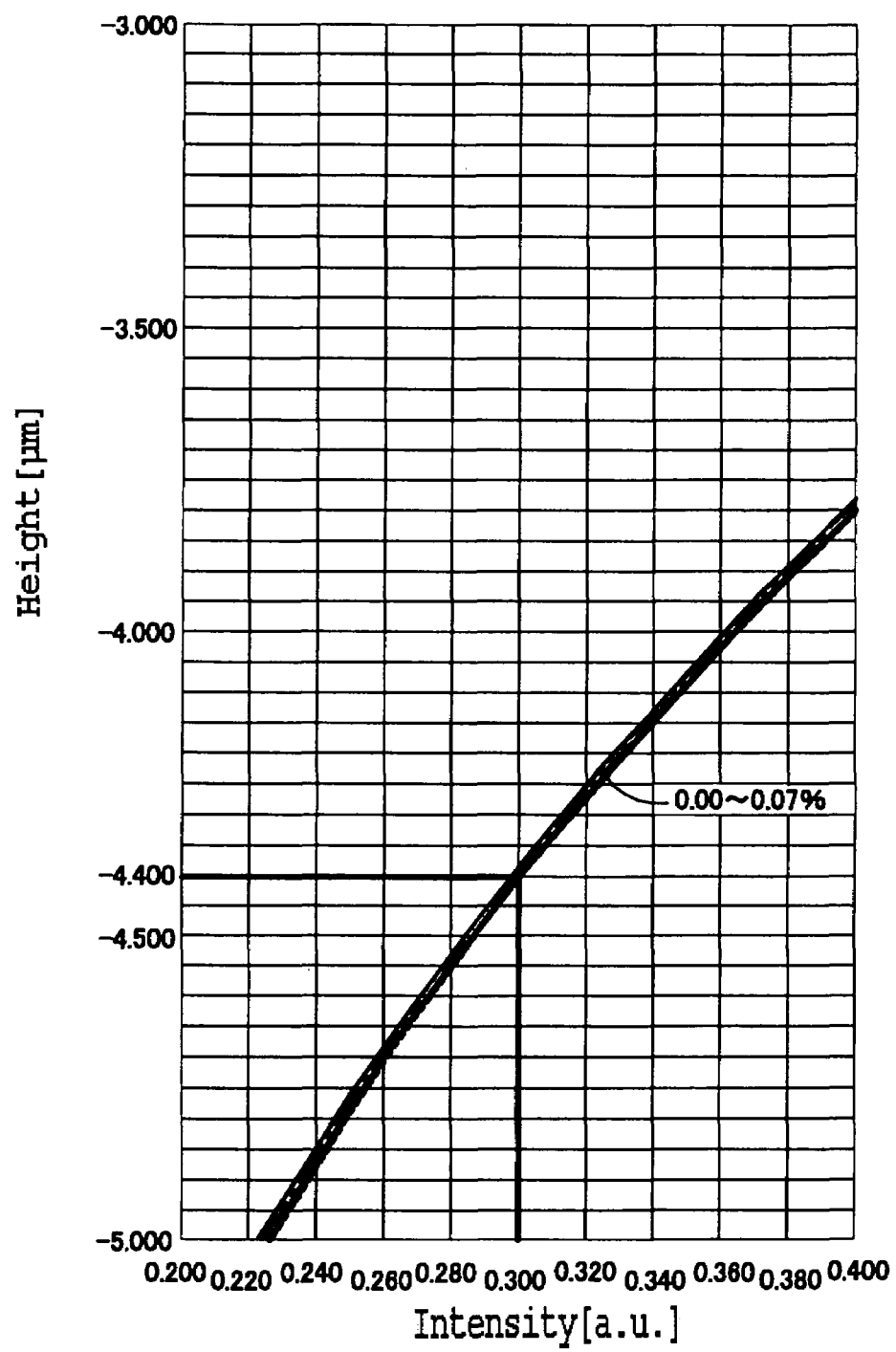

[Figure 16]
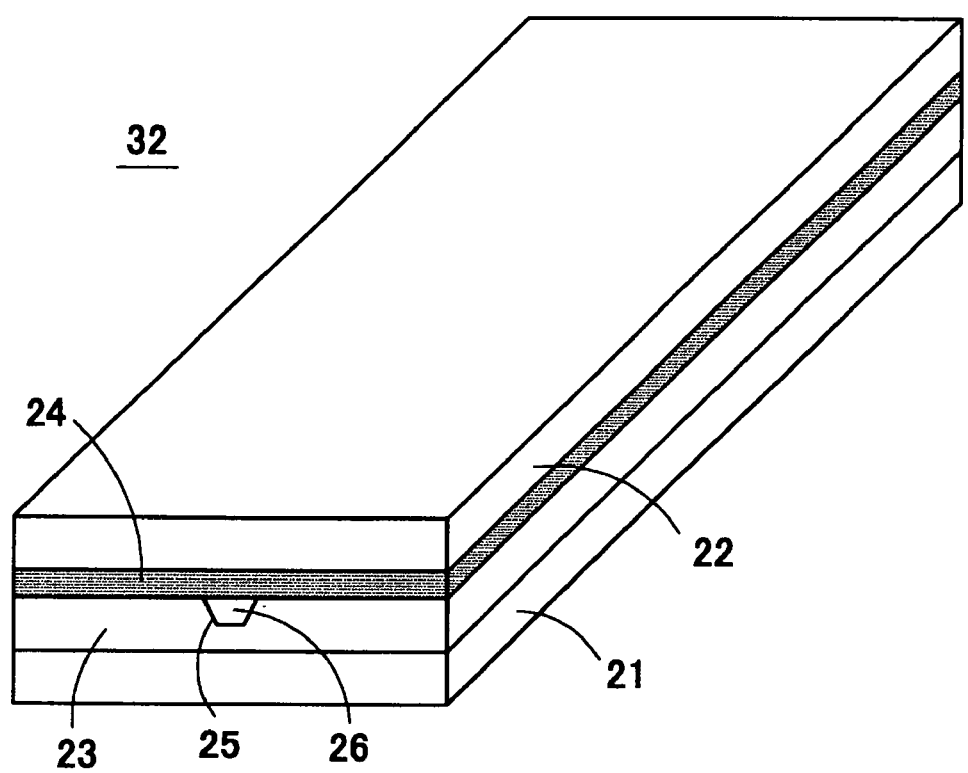

[Figure 17]
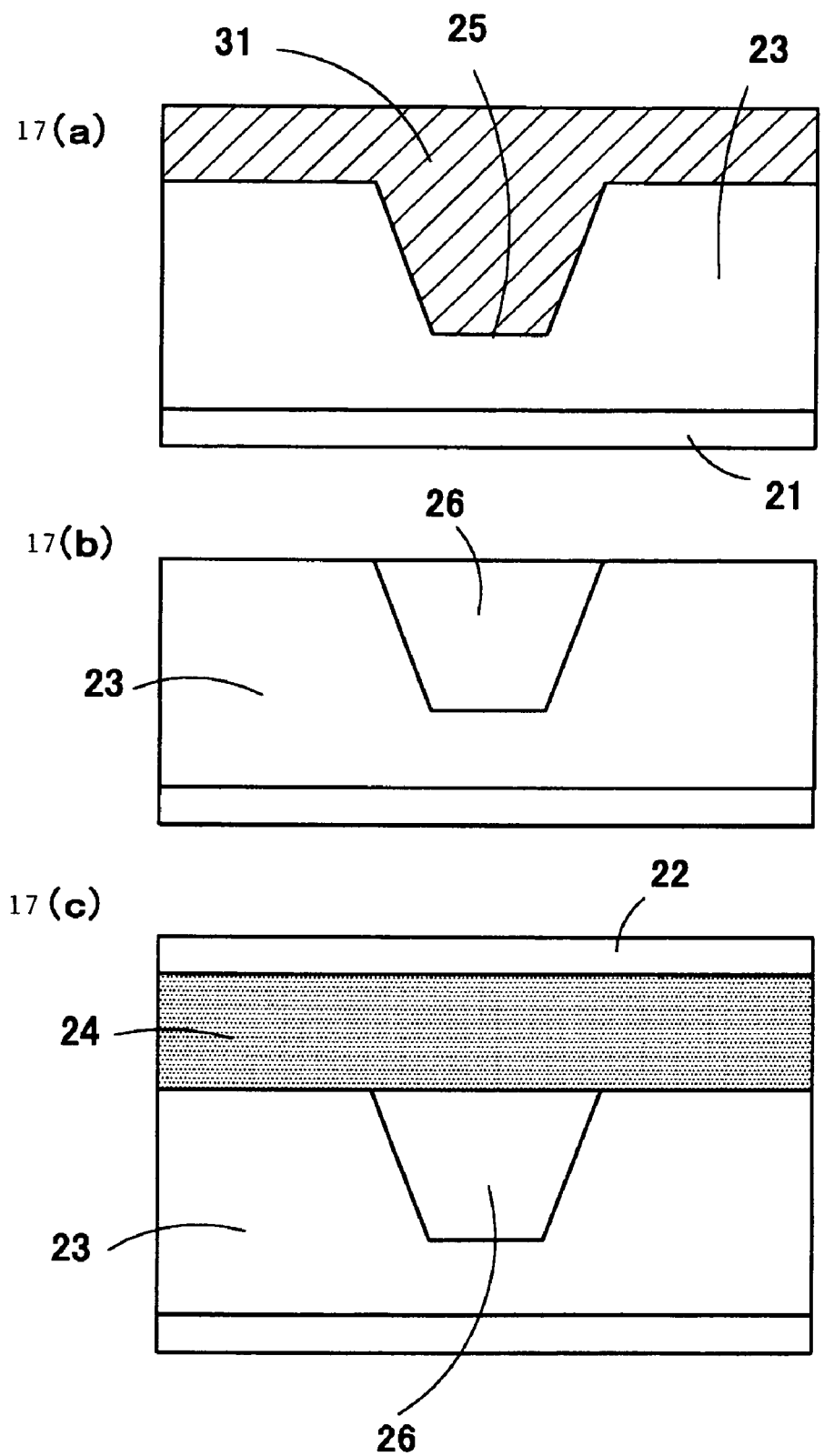

[Figure 18]
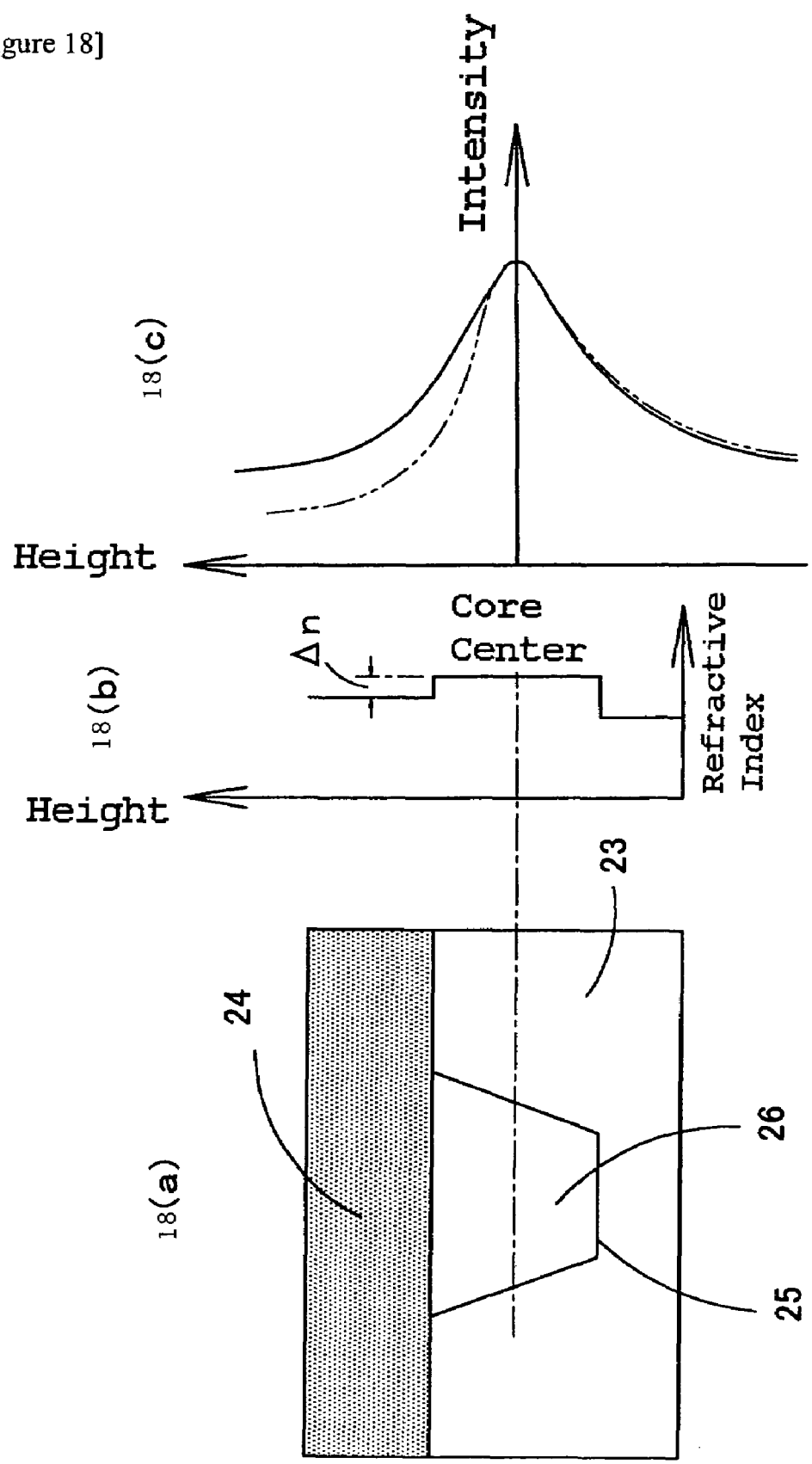

[Figure 19]
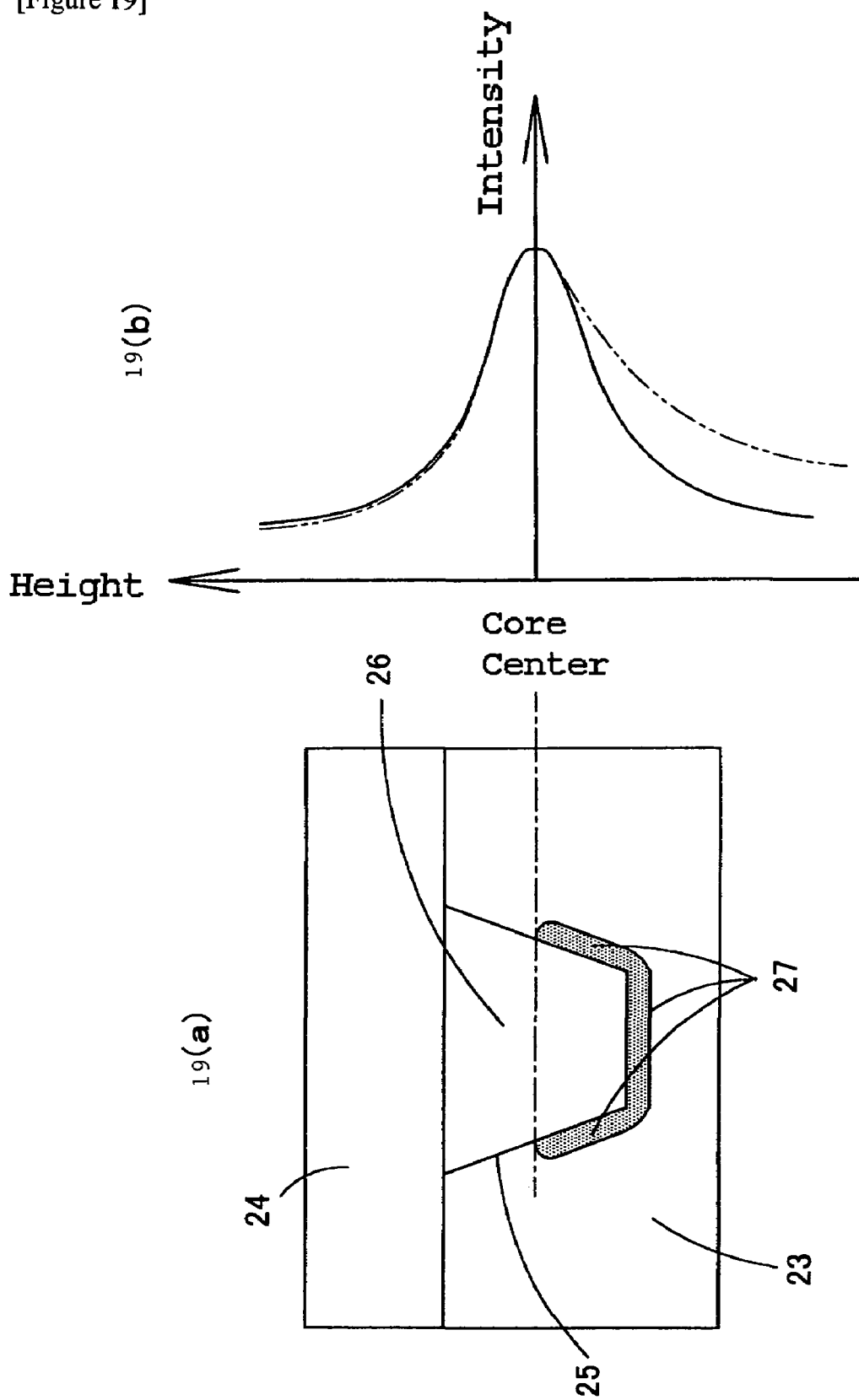

[Figure 20]
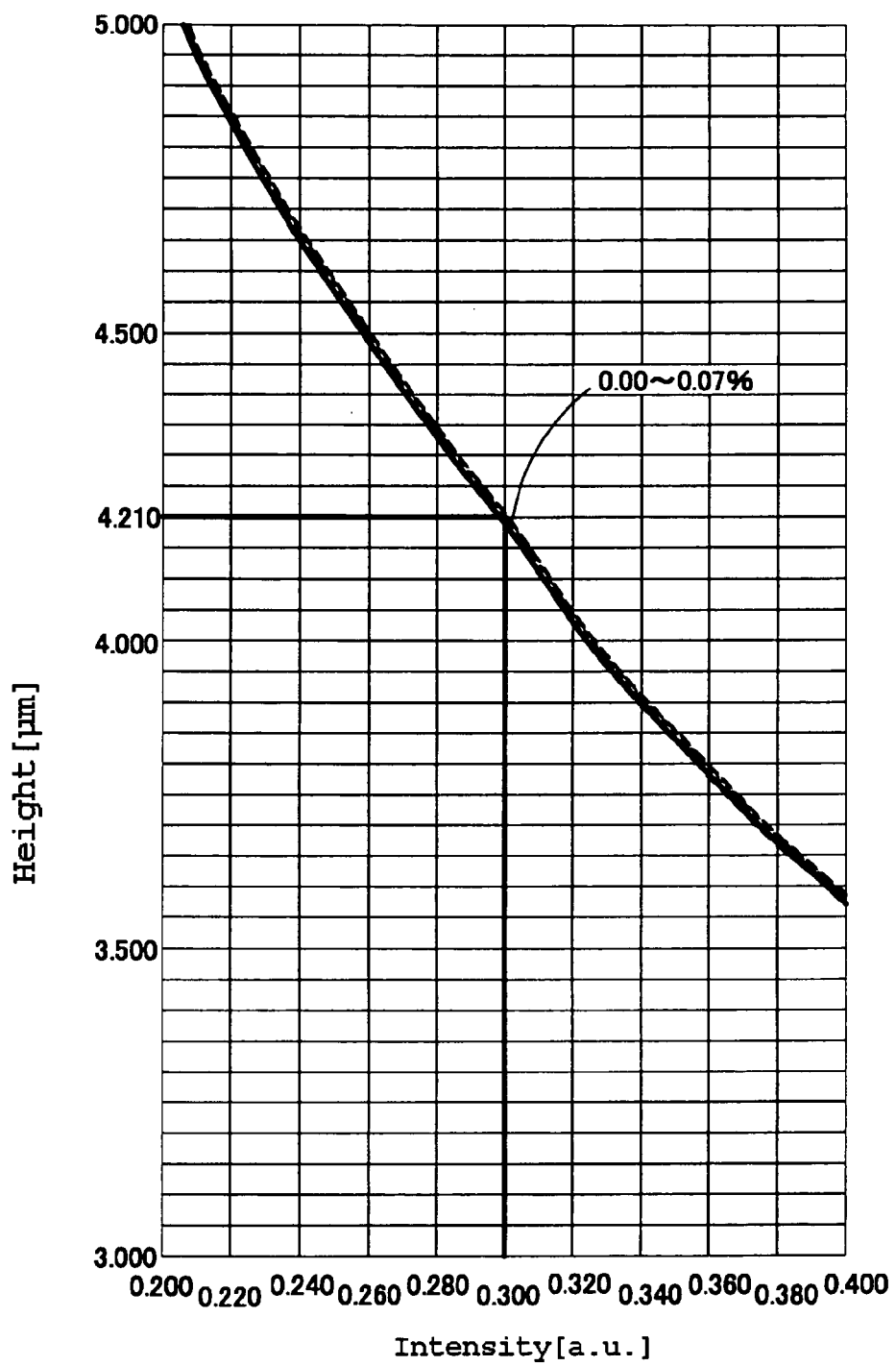

[Figure 21]
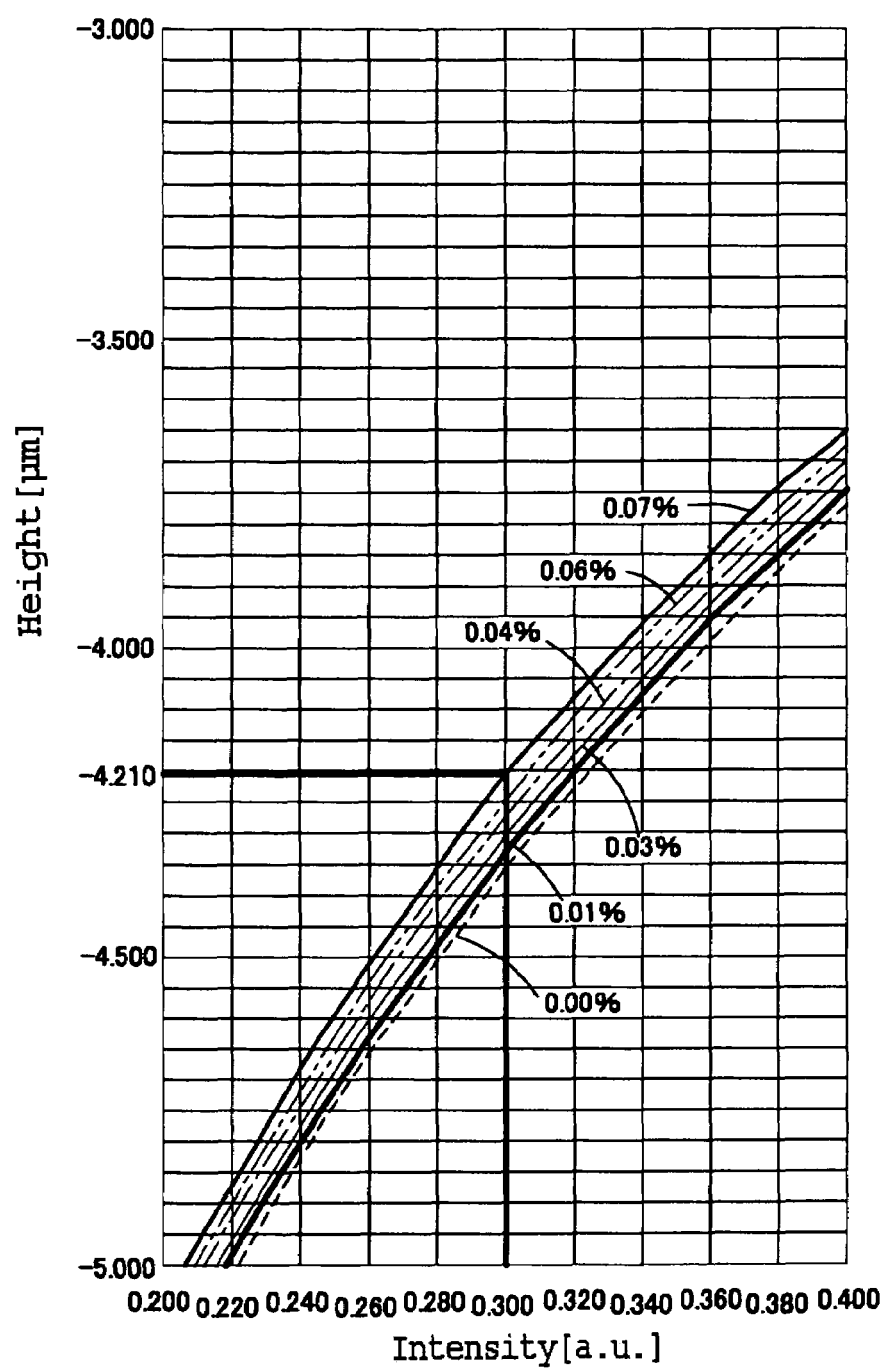

[Figure 22]
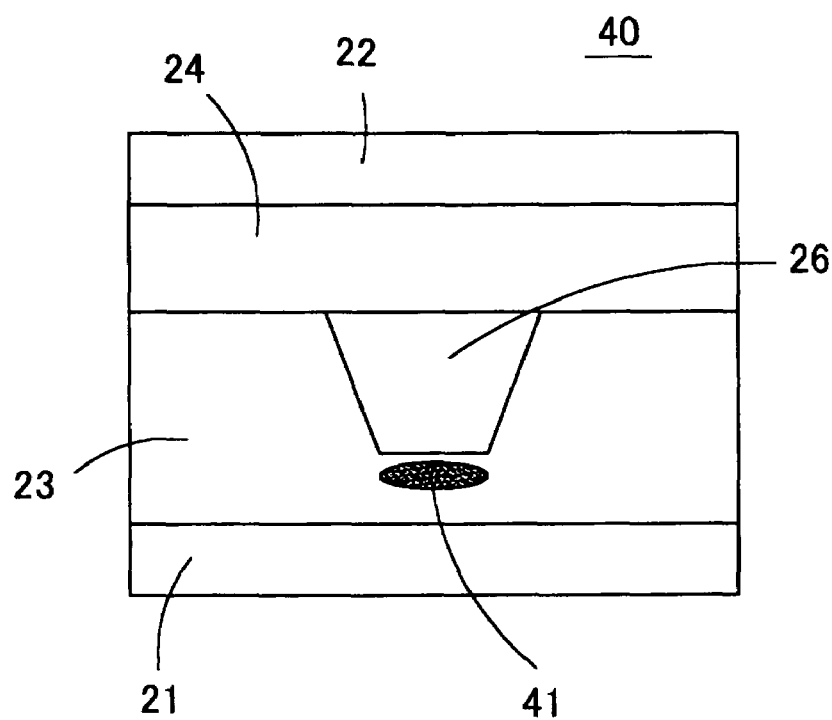

[Figure 23]
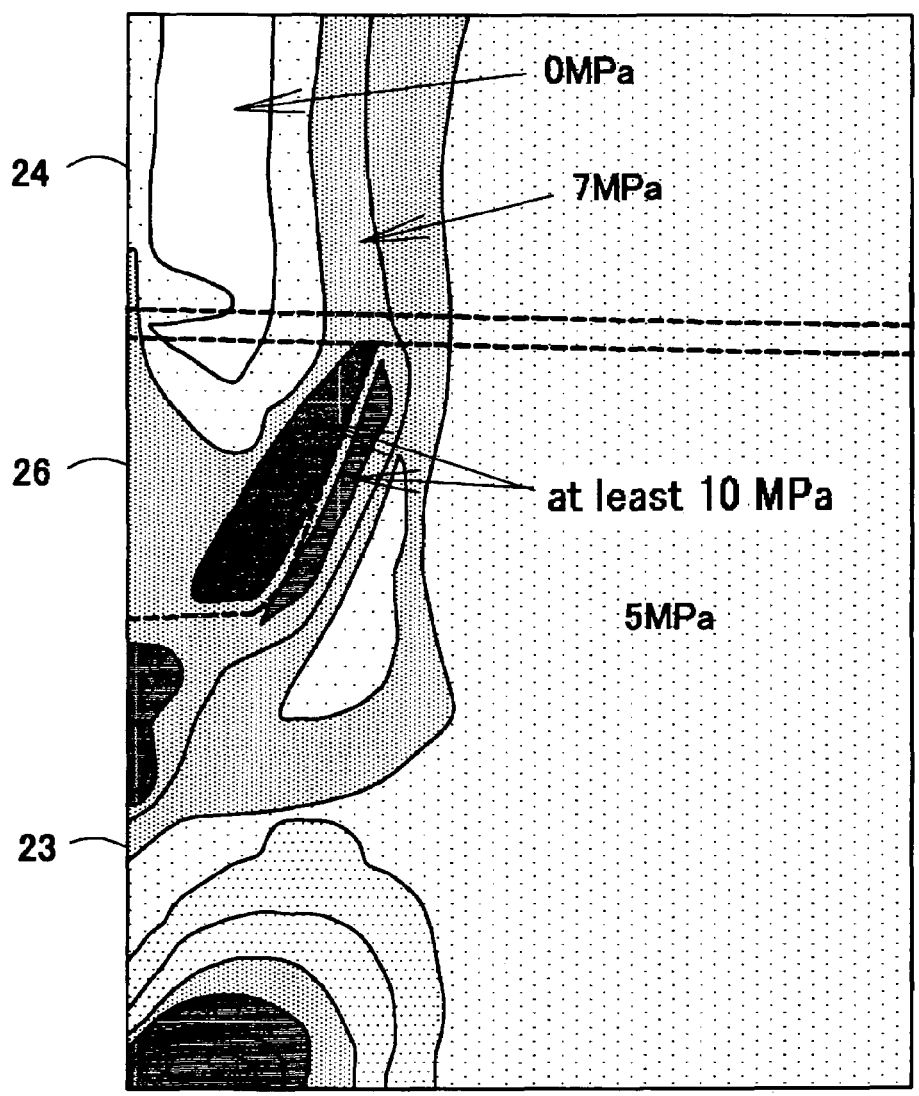

[Figure 24]
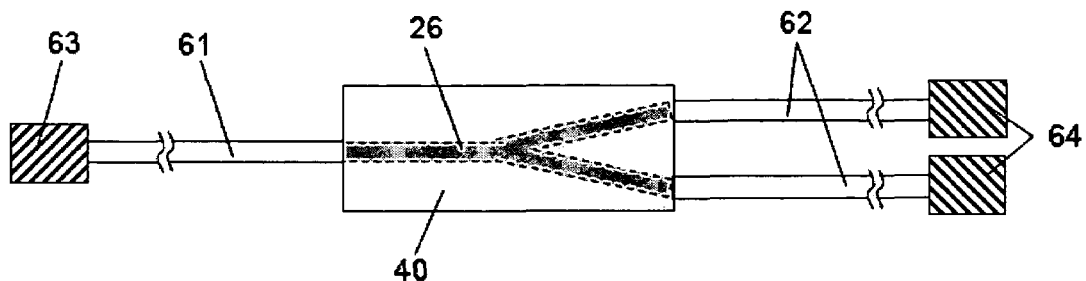

OPTICAL WAVE GUIDE AND THE METHOD OF PROPAGATING LIGHT USING THE SAME

BACKGROUND OF INVENTION

1. Field of the Invention

The invention relates generally to an optical waveguide used as a device for optical signal transmission.

2. Background Art

In order to lower connection losses with an optical fiber, an optical waveguide ideally is produced with a core having a rectangular cross-sectional shape. However, when the optical waveguide is reproduced using a stamper, cross-sectional shape of the resultant core is tapered (trapezoidal) due to release tapering and the like due to molding by the stamper (patent citation no. 1 and the like). FIG. 1 is a schematic titled-perspective view showing one example of an optical waveguide having a core cross-sectional shape which is tapered. The optical waveguide 10 comprises an upper clad layer 14 stacked on a lower clad layer 13, and sandwiched between a lower glass substrate 11 and an upper glass substrate 12, and a core 16 filling a core trench 15 disposed in the upper face of the lower clad layer 13.

The lower clad layer 13 of this type of optical waveguide 10 is produced, for example, by the stamping method. According to this stamping method, an ultraviolet light curing type resin is poured on the glass substrate 11, the ultraviolet light curing type resin is pressed by a stamper and is spread out between the stamper and the substrate, and the lower clad layer 13 is molded by causing the ultraviolet light curing type resin to cure by exposure to ultraviolet light. Although during such production the core trench 15 is formed in the upper face of the lower clad layer 13 due to a convex shape possessed by the stamper, due to the imparting of a taper tilted with respect to the direction of mold separation at both side faces of the convex shape for ready mold release of the stamper, a taper is formed along the depth direction at both side faces of the core trench 15. Thereafter the core 16 is formed by filling the core trench 15 molded in the upper face of the lower clad layer 13 with a core material. Thereafter the upper clad layer 14 is formed between the lower clad layer 13 and the glass substrate 12, and the core 16 is sealed between the lower clad layer 13 and the upper clad layer 14. Thus the interior of the core trench 15 is filed with the core material, and as viewed in cross section perpendicular to the core lengthwise direction, a taper is imparted along the depth direction at both side faces of the core 16.

Moreover, in order to make the mold readily release from the lower clad layer formed from resin within the mold during molding of the lower clad layer by irradiation molding, a taper is imparted to the core trench along the depth direction. Moreover, even when the core is formed by deposition of the core material on the lower clad layer utilizing a semiconductor manufacturing process, a taper is produced in the core after etching due to spreading of light in the core material layer depth-wise direction during exposure. Thus, for either of these manufacturing methods, the core cross-sectional shape is tapered due to the imparting of the taper to the core.

When a taper is imparted in this manner along the height direction or depth direction as viewed in a cross section perpendicular to the length-wise direction of the core, width of the core cross section varies according to height above the lower face of the core. Thus, the effective refractive index of the part of narrow width of the core cross section is low in comparison to the effective refractive index of the part of wide width of the core cross section. Due to a lowering of the difference between this effective refractive index and refractive index of the lower clad layer or the upper clad layer, light confinement within the core becomes weaker at the part of narrow core cross sectional width in comparison the to the part of wide core cross sectional width. Therefore, when a taper is imparted to the core cross section, the height-direction mode profile around the center of the core becomes asymmetric due to the variation of width of the core cross section.

FIG. 2(a) shows the lower clad layer 13, and the upper clad layer 14, and the core 16 having a tapered cross section such that core width increases at the upper face and narrows at the lower face. Within FIG. 2(b), variation of refractive index along the height direction within this core 16 is indicated above and below the center of the cross section of the core 16. Within FIG. 2(c), the mode profile of optical signal transmission through the interior of this core 16 is indicated by the solid line. The vertical axis of FIG. 2(c) indicates height as measured from the center in the height direction of the cross section of the core 16, and the horizontal axis indicates intensity of the optical signal transmitted within the core 16. Moreover, the curve indicated by the broken line within FIG. 2(c) shows an ideal mode profile of a core having a rectangular cross-sectional shape. The ideal mode profile indicated by the broken line within FIG. 2(c) is centrally symmetric along the height direction of core cross section. In contrast, in the case of the tapered core cross section, leakage of light to the lower clad layer 13 at the lower face of the core 16 becomes high, and this mode profile becomes asymmetric.

Due to vertical direction asymmetry of the core mode profile of a conventional optical waveguide having a core of tapered cross section in this manner, there is a high loss of light resulting from connection with an optical fiber having a vertically symmetric mode profile of light transmitted through the core of the optical fiber.

[Patent Citation 1] Japan Publication of Unexamined Patent Application No. 2003-240991.

SUMMARY OF INVENTION

The present invention has been made in view of the above circumstances in the art, and one or more embodiments of the present invention decrease asymmetry of the mode profile of the optical waveguide having an asymmetric mode profile due to shape of the core cross section.

In accordance with one aspect of the present invention, an optical waveguide comprises a clad layer, and a core buried within a clad layer, wherein, as viewed in cross section perpendicular to the direction of propagation of light, width of the core gradually increases or decreases with distance from the surface of the clad layer, and in the proximity of the interface between the clad layer and the face of narrower width of the core, a refractive index adjustment region is disposed having a refractive index higher than refractive index of the core or lower than refractive index of the clad layer. Here the term "clad layer" may refer to either the upper clad layer or the lower clad layer, or may refer to a monolithic clad layer. Also the phrase "distance from the surface of the clad layer" refers to core height direction or depth direction distance from the surface of the clad layer.

For an optical waveguide in accordance with one or more embodiments of the present invention, due to formation of the refractive index adjustment region of higher refractive index than the core, the difference between the refractive index of the clad layer and the effective refractive index of the core at the narrow side of the core (refractive index adjustment region) becomes large, and it is possible to increase degree of confinement of light up to that of the wide side of the core. It is thus possible for the profile of intensity of light transmitted through the core to approach symmetry. Moreover, due to formation of the refractive index adjustment region of smaller refractive index than the clad layer, the difference between the refractive index of the clad layer and the effective refractive index of the core at the narrow side of the core (refractive index adjustment region) becomes large, and it is possible to increase degree of confinement of light up to that of the wide side of the core. It is possible by this means to increase efficiency of the connection with an optical fiber and the like.

An embodiment of the present invention can be made by forming the refractive index adjustment region by material-modification of the clad layer or the core. For example, metal or semiconductor ions can be implanted in the clad layer or the core, and the ions can be made to diffuse, etc. to cause material-modification of an arbitrary depth.

Moreover, according to an embodiment of the present invention, the refractive index adjustment region can be formed at the interface between the core and the clad layer by deposition of a substance which differs from the core and clad layer. A metal or semiconductor can be used as the deposited material. The refractive index adjustment region can be readily formed by this method during the optical integrated circuit manufacturing process.

Moreover, according to an embodiment of the present invention, the refractive index adjustment region can have a higher tensile stress than the surroundings.

Due to formation of the region of tensile stress higher than that of the surroundings in the proximity of the interface between the clad layer and the face of narrower width of the core according to this embodiment of the present invention, it is possible to form a region at the narrow width core side having a refractive index smaller than the clad layer. Thus the difference between the refractive index of the region of high tensile stress and the effective refractive index of the core at the narrow core width side in increased, and it becomes possible to increase degree of confinement of light up to that of the wide side of the core. It is possible by this means to increase efficiency of the connection with an optical fiber and the like, and it is possible for the profile of intensity of light transmitted through the core to approach symmetry.

It is possible by this means to increase efficiency of the connection with an optical fiber and the like.

In accordance with one aspect of the present invention, an optical waveguide comprises a lower clad layer, an upper clad layer having a surface in contact with the lower clad layer, and a core buried between the upper clad layer and the lower clad layer, wherein, as viewed in cross section perpendicular to the direction of propagation of light, width of the core gradually increases or decreases with distance from the surface of one of the clad layers, and in the proximity of the interface between the clad layer and the wide face of the core, a refractive index adjustment region is disposed having a refractive index lower than refractive index of the core and larger than refractive index of the clad layer contacting the narrow face of the core. Here the phrase "distance from the surface of one of the clad layers" is taken to be the distance in the height direction or depth direction of the core as measured from the interface with one of the clad layers.

For an optical waveguide in accordance with one or more embodiments of the present invention, due to formation of the refractive index adjustment region of lower refractive index than the core in the region of the interface with the clad layer contacting the wide side of the core, and due to formation of the refractive index adjustment region of higher refractive index than the clad layer contacting the narrow side of the core, the difference between the refractive index of the clad layer and the effective refractive index of the core at the wide side of the core becomes small, and it is possible to weaken degree of confinement of light down to that of the narrow side of the core. It is thus possible for the profile of intensity of light transmitted through the core to approach symmetry. It is possible by this means to increase connection efficiency with an optical fiber and the like.

An embodiment of the present invention can be made by forming the refractive index adjustment region by material-modification of the core or the clad layer contacting the wide side of the core. For example, metal or semiconductor ions can be implanted in the clad layer or the core, and the ions can be made to diffuse, etc. to cause material-modification of an arbitrary depth.

Moreover, according to an embodiment of the present invention, the refractive index adjustment region is the entire clad layer (i.e., the upper clad layer or the lower clad layer) contacting the wide side of the core.

Moreover, according to an embodiment of the present invention, the refractive index adjustment region can be formed at the interface between the core and one of the clad layers by deposition of a substance which differs from this core and the clad layer. A metal or semiconductor can be used as the deposited material. The refractive index adjustment region can be readily formed by this method during the optical integrated circuit manufacturing process.

An optical transmission method in accordance with one or more embodiments of the present invention comprises the steps of: irradiating light from a light transmission means, transmitting the light within the first optical fiber, irradiated the light from the first optical fiber, incident the light into a core of the optical waveguide, transmitting the light through the core of the optical waveguide, irradiating the light from the optical waveguide and incident into and through the second optical fiber, and receiving the light at a light receiving means; wherein the optical waveguide comprises a clad layer, a core buried within a clad layer, and as viewed in cross section perpendicular to the direction of propagation of light, width of the core gradually increases or decreases with distance from the surface of the clad layer, and in the proximity of the interface between the clad layer and the face of narrower width of the core, a refractive index adjustment region is disposed having a refractive index higher than refractive index of the core or lower than refractive index of the clad layer. Here the phrase "distance from the surface of the clad layer" refers to core height direction or depth direction distance from the surface of the clad layer.

As much as possible, the above mentioned constituent elements of the present invention can be combined arbitrarily. Other aspects and advantages of the invention will be apparent from the following description and the appended claims.

BRIEF DESCRIPTION OF DRAWINGS

FIG. 1 is a schematic titled-perspective view showing one example of an optical waveguide having a core cross-sectional shape which is tapered.

FIGS. 2(a)–2(c) explain the operation of the above mentioned optical waveguide.

FIG. 3 is a tilted-perspective view of the optical waveguide according to an embodiment of the present invention.

FIG. 4 illustrates a schematic cross-sectional drawing showing a modified example of the optical waveguide of FIG. 3.

FIGS. 5(a)–5(d) are schematic drawings that explain the operation of the optical waveguide shown in FIG. 3.

FIGS. 6(a)–6(c) explain the operation of the embodiment shown in FIG. 3.

FIG. 7 is a simulation chart showing variation of mode profile in the upper half of the core as refractive index of the low refractive index layer is varied.

FIG. 8 is a simulation chart showing variation of mode profile in the lower half of the core as refractive index of the low refractive index layer is varied.

FIG. 9 is a drawing for explanation of another embodiment of the present invention.

FIGS. 10(a)–10(d) are schematic drawings that explain the manufacturing steps of the optical waveguide shown in FIG. 9.

FIG. 11 is a tilted perspective view showing an optical waveguide according to yet another embodiment of the present invention.

FIGS. 12(a)–12(d) are schematic drawings that explain the manufacturing steps of the optical waveguide shown in FIG. 11.

FIGS. 13(a)–13(b) explain the operation of the embodiment shown in FIG. 11.

FIG. 14 is a simulation chart showing variation of mode profile in the upper half of the core as refractive index of the intermediate refractive index layer is varied.

FIG. 15 is a simulation chart showing variation of mode profile in the lower half of the core as refractive index of the intermediate refractive index layer is varied.

FIG. 16 is a tilted perspective view showing an optical waveguide according to yet another embodiment of the present invention.

FIGS. 17(a)–17(c) are schematic drawings that explain the manufacturing steps of the optical waveguide according to the embodiment of FIG. 16.

FIGS. 18(a)–18(c) explain the operation of the embodiment shown in FIG. 16.

FIGS. 19(a) is a schematic drawing that illustrates essential parts of an optical waveguide according to another embodiment of the present invention.

FIGS. 19(b) is a graph showing the mode profile of light transmitted through the interior of the core.

FIG. 20 is a simulation chart showing variation of mode profile in the upper half of the core as refractive index of the low refractive index layer is varied.

FIG. 21 is a simulation chart showing variation of mode profile in the lower half of the core as refractive index of the low refractive index layer is varied.

FIG. 22 is a tilted perspective view showing an optical waveguide according to yet another embodiment of the present invention.

FIG. 23 is a chart shows distribution of stress within the optical waveguide.

FIG. 24 is a schematic drawing of a transmission method of light according to yet another embodiment of the present invention.

DETAILED DESCRIPTION

The present invention is explained specifically below with reference to specific embodiments. These embodiments are merely examples, and the present invention is not limited to only the embodiments described below.

FIG. 3 is a tilted perspective view showing an optical waveguide according to an embodiment of the present invention. The optical waveguide 20 comprises an upper clad layer 24 stacked on a lower clad layer 23, and sandwiched between a lower glass substrate 21 and an upper glass substrate 22. A core 26 is disposed within a core trench 25 formed in the upper face of the lower clad layer 23. A taper is imparted to both lateral faces of the core 26 so that the cross-sectional shape of the core 26 is a trapezoid which is narrowest at the bottom face. Moreover, a low refractive index layer 27 is disposed between the lower face of the core 26 (most narrow face) and the lower clad layer 23. The lower clad layer 23 and the upper clad layer 24 are formed using transparent resin(s) and have equal refractive indexes. The lower clad layer 23 and the upper clad layer 24 are preferably formed using the same transparent resin. The core 26 is formed from a transparent resin having a refractive index higher than the refractive indexes of the lower clad layer 23 and the upper clad layer 24. The low refractive index layer 27 has a refractive index lower than the refractive index of the lower clad layer 23. In a specific example, when height of the core 26 is taken to be 6 μm, then thickness of the low refractive index layer 27 becomes about 0.5–1.0 μm.

Furthermore, although the low refractive index layer 27 of FIG. 3 is disposed at the lower face of the core trench 25, it is also permissible for the low refractive index layer 27 to be buried at a position of shallow depth below the lower face of the core trench 25 as shown in FIG. 4. Moreover, it is possible for the low refractive index layer 27 to be disposed within the core 26 in the proximity of the lower face thereof, although this case is not shown in the figures. In this case, however, the center of the profile of intensity of light is displaced upward since the center of the core 26 moves upward.

FIG. 5(a) through FIG. 5(d) are schematic drawings for explanation of the manufacturing steps of the optical waveguide 20 shown in FIG. 3. First, an ultraviolet curing type resin is poured onto the upper face of a glass substrate 21. Thereafter a stamper 31 is pressed thereupon, and the ultraviolet curing type resin is pressed and spread out between the stamper 31 and the glass substrate 21. After the ultraviolet curing type resin is cured by ultraviolet radiation to form a lower clad layer 23, the stamper 31 is released from the lower clad layer 23. A core trench 25 is formed in the lower clad layer 23 molded in this manner (FIG. 5(a)). Cross-sectional shape of the core trench 25 becomes a trapezoid tapering at both side faces due to the provision of a trapezoid-shaped protuberance of downwardly narrowing width on the stamper 31.

Thereafter, a metal or a semiconductor such as Si and the like is deposited by vacuum deposition on the upper face of the core trench 25 along the entire length thereof. This metal or semiconductor is preferably a substance which acts as a dopant by causing a lowering of refractive index of the lower clad layer 23, or alternatively, by causing a lowering of refractive index of the lower clad layer 23 after diffusing therein. Since refractive index is lowered when the metal or semiconductor is deposited on the lower face of the core trench 25, the low refractive index layer 27 is formed at the lower face of the core trench 25 having a refractive index lower than the refractive index of the lower clad layer 23 (FIG. 5(b)). Alternatively, it is possible to form the lower refractive index layer 27 by material-modification of the lower face of the core trench 25 by ion implantation by implanting a metal ion, hydrogen ion, helium ion, etc. in the lower face of the core trench 25.

Thereafter, the interior of the core trench 25 is filled with a core material resin to form the core 26 (FIG. 5(c)). Thereafter ultraviolet curing type resin is also poured onto the lower clad layer 23 and the core 26, and the ultraviolet curing type resin is pressed by the glass substrate 22 to press and spread out the ultraviolet curing type resin between the glass substrate 22 and the lower clad layer 23. The ultraviolet curing type resin cures and an upper clad layer 24 is formed by ultraviolet irradiation of the ultraviolet curing type resin to manufacture the optical waveguide 20 (FIG. 5(d)).

FIG. 6 is a drawing for explanation of the embodiment shown in FIG. 3. FIG. 6(a) is a schematic drawing showing the proximity of the core of the optical waveguide 20. FIG. 6(b) is a drawing showing variation of refractive index along the height direction at the center of the core 26. FIG. 6(c) is a drawing indicating the mode profile of the optical signal transmitted through the interior of the core. The vertical axis of FIG. 6(c) indicates height as measured from the center in the height direction of the cross section of the core 26, the horizontal axis indicates intensity of the optical signal transmitted within the core 26, and the mode profile of optical signal transmission through the interior of the core 26 is indicated by the solid line. The curve indicated by the chain double-dashed line indicates the mode profile of the conventional technology example in FIG. 2(c).

In the case of the conventional technology example which does not have the low refractive index layer 27, since width of the core 26 decreases toward the lower face, the effective refractive index at the bottom of the core 26 becomes small, and this reduces the difference between the effective refractive index at the bottom of the core 26 and the refractive index of the lower clad layer 23. Thus leakage of light from the lower face of the core 26 becomes high as indicated by the chain double-dashed line in FIG. 6(c), and the mode profile becomes asymmetric.

In the case of the present embodiment, the low refractive index layer 27 is disposed in the proximity of the interface between the lower face of the core 26 and the lower clad layer 23 (FIG. 6(a)). Since refractive index of the low refractive index layer 27 is lower than the refractive index of the lower clad layer 23, it is possible to consider the low refractive index layer 27 as one part of the lower clad layer 23. Thus the difference □n of refractive index between the low refractive index layer 27 and the effective refractive index of the core 26 at the interface between the lower clad layer 23 and the lower face of the core 26 of the present embodiment (FIG. 6(b)) becomes higher than would be the case if there was no low refractive index layer 27. As a result, confinement of light by the lower face of the core 26 increases, and as indicated by the solid line in FIG. 6(c), the asymmetry of the mode profile is decreased. Since the mode profile approaches a symmetrical shape, this results in a symmetric shape also for the 2-dimensional intensity distribution at the core 26 which has the trapezoid shaped cross section. Thus connection efficiency with an optical fiber is improved due to the mode profile approaching symmetry.

Although gradually increasing the refractive index of the core having the trapezoidal cross section from the wide side to the narrow side might be considered in order to make the mode profile symmetric, such a method would be troublesome for manufacture of the core and would raise costs. Moreover, due to variation of refractive index through the entire interior of the core, there would be concern for distortion of the waveform of the signal transmitted through the interior of the core. In contrast, refractive index is uniform throughout the entire interior of the core 26 according to the present embodiment, and thus manufacture of the optical waveguide 20 is simple, and it is difficult for distortion of the transmitted signal waveform to occur.

FIG. 7 and FIG. 8 are plots of the mode profile as refractive index of the low refractive index layer 27 is varied for the optical waveguide 20. FIG. 7 shows the mode profile above the center of the core 26, and FIG. 8 shows the mode profile below the center of the core 26. For both of these figures, height is indicated by the vertical axis, and intensity of the optical signal is indicated by the horizontal axis. Simulation conditions of the mode profile shown in FIG. 7 and FIG. 8 are as follows: central height of the core and width thereof are both 6 μm, and refractive index difference between the core 26 and the lower clad layer 23 is 0.37% of the refractive index of the core 26. Moreover, thickness of the low refractive index layer 27 is 1 μm, and width of the low refractive index layer 27 is equal to width of the lower face of the core 26. Also difference between refractive index of the low refractive index layer 27 and the lower clad layer 23 was set to 0.00%, 0.01%, 0.03%, 0.04%, 0.06%, or 0.07% below refractive index of the lower clad layer 23, and the patterns of 6 mode profiles were determined. These results are shown in FIG. 7 and FIG. 8.

For example, looking up the height of the location where, for example, intensity becomes 0.300 a.u. for the upward side mode profile shown in FIG. 7 gives a height of about 4.210 μm from the center of the core 26 independent of refractive index of the low refractive index layer 27. Thus, if the mode profile is symmetric, then it is anticipated that the intensity of 0.300 a.u. occurs at the height of −4.210 μm from the center of the core 26. By referring to the mode profile of FIG. 8, when the refractive index of the low refractive index layer 27 is lowered to a value of 0.06% less than the refractive index of the lower clad layer 23, it is found that intensity becomes 0.300 a.u. when height is about −4.210 μm. Thus, it is found that a nearly symmetrical mode profile is obtained if refractive index of the low refractive index layer 27 is made about just 0.06% smaller than the refractive index of the lower clad layer 23.

Although the layer of refractive index below that of the lower clad layer was disposed in the proximity of the interface between the lower face of the core 26 and the lower clad layer 23 according to the above mentioned embodiment, it is also permissible to dispose a layer of slightly higher refractive index than the core 26 in the proximity of this interface. FIG. 9 is a drawing for explanation of this type of embodiment. FIG. 9(a) is a schematic drawing showing the proximity of the core of this optical waveguide. A core 26 is formed with a cross-sectional trapezoidal shape which narrows toward the lower face. A high refractive index layer 28 of refractive index somewhat higher than refractive index of the core 26 is disposed in the proximity of the bottom part of the core 26. FIG. 9(b) is a drawing showing variation of refractive index along the height direction at the center of the core 26. FIG. 9(c) is a drawing indicating the mode profile of the optical signal transmitted through the interior of the core. The curve indicated by the chain double-dashed line indicates the mode profile of the conventional technology example.

Furthermore, although the high refractive index layer 28 is provided at the lower face of the core 26 in FIG. 9(a), it is also permissible to dispose the high refractive index layer 28 slightly above the lower face of the core 26. Moreover, it is permissible to dispose the high refractive index layer 28 within the core trench 25 in the proximity of the lower face thereof (or in the lower clad layer 23 in the proximity of the lower face of the core trench 25).

In the embodiment indicated in FIG. 9, the high refractive index layer 28 is disposed in the proximity of the interface between the lower face of the core 26 and the lower clad layer 23 (FIG. 9(a)). Since refractive index of this high refractive index layer 28 is higher than refractive index of the core 26, it is possible to consider the refractive index layer 28 as one part of the core 26. Thus the difference □n (FIG. 9(b)) between refractive index of the lower clad layer 23 and effective refractive index of the high refractive index layer 28 occurring at the interface between the bottom face of the core 26 and the lower clad layer 23 according to the present embodiment become higher than would be the case if the high refractive index layer 28 was not present. As a result, confinement of light by the lower face of the core 26 increases, and as indicated by the solid line in FIG. 9(c), this relieves the asymmetry of the mode profile. Since the mode profile approaches a symmetrical shape, this results in a symmetric shape also for the 2-dimensional intensity distribution at the core 26 which has the trapezoid shaped cross section. Thus connection efficiency with an optical fiber is improved due to the mode profile approaching symmetry. The connection position of the optical fiber moves downward for the present embodiment due to downward displacement of the center of the profile of intensity of light due to the effect of refractive index of the high refractive index layer 28.

Moreover, due to uniformity of refractive index through the entire core 26 of the present embodiment, manufacture of the optical waveguide 20 is easy, and it is difficult for distortion of the transmitted signal waveform to occur.

FIG. 10(a) through FIG. 10(b) are schematic drawings for explanation of the manufacturing steps of the optical waveguide shown in FIG. 9. First, the lower clad layer 23 having the core trench 25 is molded on the upper face of the glass substrate 21 (FIG. 10(a)). The cross sectional shape of the core trench 25 becomes a trapezoid which tapers at both side faces.

Thereafter a metal or a semiconductor such as Si and the like is deposited by vacuum deposition on the lower surface and along the entire length of the core trench 25. This metal or semiconductor is diffused into the core 26 as a dopant and is capable of use for increasing refractive index of the core 26. When this type of metal or semiconductor is deposited on the lower face of the core trench 25, since the refractive index of the core 26 increases, the high refractive index layer 28 having a higher refractive index than the refractive index of the core 26 is formed at the lower face of the core 26 (FIG. 10(b)).

Thereafter the core 26 is made by filling the interior of the core trench 25 with core material resin (FIG. 10(c)). Thereafter the upper clad layer 24 is formed between the glass substrate 22 and the lower clad layer 23 and the upper face of the core 26 to produce the optical waveguide (FIG. 10(d)).

Furthermore, although illustration of the state of the simulation of the mode profile is omitted in this case, this state becomes similar to that shown in FIG. 7 and FIG. 8.

FIG. 11 is another embodiment of the present invention and shows an optical waveguide 30 in which, in the upper clad layer 24 at the interface between the upper clad layer 24 and the upper face (widest face) of the core 26, an intermediate refractive index layer 29 is formed having a refractive index above refractive index of the upper clad layer 24 and below refractive index of the core 26.

Furthermore, although the intermediate refractive index layer 29 is disposed at the lower face of the upper clad layer 24 in FIG. 11, it is also permissible for the intermediate refractive index layer 29 to be disposed in the proximity of the upper face of the core 26.

FIG. 12(a) through FIG. 12(b) are schematic drawings for explanation of the manufacturing steps of the optical waveguide 30 shown in FIG. 11. First, an ultraviolet curing type resin is poured onto the upper face of a glass substrate 21. Thereafter a stamper 31 is pressed thereupon, and the ultraviolet curing type resin is pressed and spread out between the stamper 31 and the glass substrate 21. After the ultraviolet curing type resin is cured by ultraviolet radiation to form a lower clad layer 23, the stamper 31 is released from the lower clad layer 23. A core trench 25 is formed in the lower clad layer 23 molded in this manner (FIG. 12(a)). Cross-sectional shape of the core trench 25 becomes an inverted trapezoid tapering at both side faces. The core trench 25 is filled with core material resin to form the core 26 (FIG. 12(b)).

Thereafter a metal or a semiconductor such as Si and the like is deposited on the upper face of the core 26 to form (FIG. 12(c)) on the upper face of the core 26 the intermediate refractive index layer 29 having a refractive index above refractive index of the upper clad layer 24 and below refractive index of the core 26.

Thereafter ultraviolet curing type resin is also poured onto the lower clad layer 23 and the intermediate refractive index layer 29, and the ultraviolet curing type resin is pressed by the glass substrate 22 to press and spread out the ultraviolet curing type resin between the glass substrate 22 and the lower clad layer 23. Thereafter the ultraviolet curing type resin cures and an upper clad layer 24 is formed by ultraviolet irradiation of the ultraviolet curing type resin to manufacture the optical waveguide 30 (FIG. 12(d)).

According to the embodiment shown in FIG. 11, refractive index of the intermediate refractive index layer disposed in the proximity of the interface between the upper face of the core 26 and the upper clad layer 24 is somewhat lower than refractive index of the core 26 and is somewhat higher than refractive index of the upper clad layer 24 (FIG. 13(a)), and thus the difference □n between the effective refractive index of the core 26 at the interface between the upper face of the core 26 and the upper clad layer 24 and refractive index of the intermediate refractive index layer 29 becomes smaller (FIG. 13(b)) than would be the case if there was no intermediate refractive index layer 29. As a result, confinement of light by the upper face of the core 26 weakens, and as indicated by the solid line shown in FIG. 13(c), asymmetry of the mode profile is eased. Since the mode profile approaches a symmetrical shape, this results in a concentric shape also for the 2-dimensional intensity distribution at the core 26 which has the trapezoid shaped cross section. Thus connection efficiency with an optical fiber is improved due to the mode profile approaching symmetry.

FIG. 14 and FIG. 15 were drawn based on simulation of variation of refractive index of the intermediate refractive index layer 29 of the optical waveguide 30. The simulation of FIG. 14 and FIG. 15 was made under the same conditions as those of FIG. 7 and FIG. 8. Also the patterns of 6 mode profiles showing the difference between refractive index of the intermediate refractive index layer 29 and refractive index of the upper clad layer 24 set to 0.00%, 0.01%, 0.03%, 0.04%, 0.06%, or 0.07% above refractive index of the upper clad layer 24 are shown in FIG. 14 and FIG. 15.

Here, looking up the height of the location where, for example, intensity becomes 0.300 a.u. for the downward side mode profile shown in FIG. 15 gives a height of about −4.400 μm from the center of the core 26 independent of refractive index of the intermediate refractive index layer 29. Thus if the mode profile is symmetric, then it is anticipated that the intensity of 0.300 a.u. occurs at the height of 4.400 μm from the center of the core 26. By referring to the mode profile of FIG. 14, when the refractive index of the intermediate refractive index layer 29 is raised (by the implantation method) to a value 0.120% higher than refractive index of the upper clad layer 24, it is found that intensity becomes 0.300 a.u. when height is about 4.400 μm. Thus it is found that a nearly symmetrical mode profile is obtained if refractive index of the intermediate refractive index layer 29 is made about just 0.120% higher than refractive index of the upper clad layer 24.

Although the intermediate refractive index layer 29 was formed upon the core 26 according to the embodiment of FIG. 11, it is also permissible to make the entire refractive index of the upper clad layer higher. That is to say, as shown in FIG. 16, refractive index of the upper clad layer becomes higher than refractive index of the lower clad layer 23 and lower than refractive index of the core 26.

FIG. 17(a) through FIG. 17(c) are drawings for explanation of steps for manufacture of an optical waveguide 32 according to the embodiment of FIG. 16. First, a lower clad layer 23 having a trapezoidal cross section-shaped core trench 25 is molded on the upper face of a glass substrate 21 (FIG. 17(a)). Thereafter, the core 26 is made by filling the interior of the core trench 25 with core material resin (FIG. 17(b)). Thereafter, an upper clad layer 24 is formed between the glass substrate 22 and the lower clad layer 23 and the upper face of the core 26 using a resin having a higher refractive index than refractive index of the lower clad layer 23 (FIG. 17(c)).

FIG. 18 is a drawing for explanation of the operation of the embodiment shown in FIG. 16. FIG. 18(a) is a schematic drawing showing the proximity of the core 26 of the optical waveguide 32. FIG. 18(b) is a graph showing variation of refractive index along the height direction at the center of the core 26. FIG. 18(c) is a graph showing the mode profile of the optical signal transmitted through the interior of the core 26. The vertical axis of FIG. 18(c) indicates height as measured from the center in the height direction of the cross section of the core 26, and the horizontal axis indicates intensity of the optical signal transmitted within the core 26. The curve indicated by the solid line shows the mode profile of the optical signal transmitted through the interior of the core 26, and the curve indicated by the chain double-dashed line within FIG. 18(c) shows the mode profile of the conventional technology example.

Since refractive index of the upper clad layer 24 is higher than refractive index of the lower clad layer 23 according to the present embodiment, as shown in FIG. 18(c), the difference □n between effective refractive index of the upper face of the core 26 and refractive index of the upper clad layer 24 becomes equivalent to the difference between the effective refractive index of the lower face of the core 26 and refractive index of the lower clad layer 23. Thus as shown in FIG. 18(c), leakage from the upper face side of the core 26 of light transmitted through the interior of the core 26 becomes high, and the mode profile approaches symmetry. Thus connection efficiency between the core 26 and an optical fiber is improved.

Although no simulation of mode profiles is shown for this embodiment, as per operation of this embodiment, clearly the simulation of this embodiment displays the same type of trends as the simulation of FIG. 14 and FIG. 15.

Furthermore, a modified version of this embodiment divides the lower clad layer 23 into a layer disposed at the same height as the core 26 and having nearly the same thickness as the core 26 and a layer disposed below the core 26, whereas refractive index of the layer disposed below the core 26 may be lower than refractive index of the layer disposed at nearly the same height as the core 26 (not shown in the figures).

FIG. 19 shows an embodiment of the present invention having a low refractive index layer 27 formed in the lower clad layer 23 in the proximity of the lower face and the bottom of both side faces of the core 26. Here thickness of the core 26 is taken to be 6 μm, and thickness of the low refractive index layer 27 extending from the core 26 lower face along both side faces of the core 26, for example, is taken to be 1 μm. This embodiment is equivalent to extending the low refractive index layer 27 disposed at the lower face of the core 26 of the embodiment of FIG. 3 up to the bottom of both side faces of the core 27. This thus operates in the same manner as the embodiment of FIG. 3, and it is possible to make the mode profile of light transmitted through the interior of the core symmetric.

FIG. 20 and FIG. 21 were drawn based on a simulation showing variation of refractive index of the low refractive index layer 27 of the present embodiment. The simulation of FIG. 20 and FIG. 21 was made under the same conditions as those of FIG. 7 and FIG. 8. Also the patterns of 6 mode profiles
   showing the difference between refractive index of the low refractive index layer 27 and refractive index of the lower clad layer 23 set to 0.00%, 0.01%, 0.03%, 0.04%, 0.06%, or 0.07% below refractive index of the lower clad layer 23 are shown in FIG. 20 and FIG. 21.

Here, looking up the height of the location where, for example, intensity becomes 0.300 a.u. for the upward side mode profile shown in FIG. 20 gives a height of about 4.210 μm from the center of the core 26 independent of refractive index of the low refractive index layer 27. Thus if the mode profile is symmetric, then it is anticipated that the intensity of 0.300 a.u. occurs at the height of −4.210 μm from the center of the core 26. By referring to the mode profile of FIG. 21, when the refractive index of the low refractive index layer 27 is lowered to a value 0.07% lower than refractive index of the lower clad layer 23, it is found that intensity becomes 0.300 a.u. when height is about −4.210 μm. Thus, it is found that a nearly symmetrical mode profile is obtained if refractive index of the low refractive index layer 27 is made about just 0.07% lower than refractive index of the lower clad layer 23.

Furthermore, it is possible for the present invention to be achieved by combination of the above mentioned embodiments. For example, it is permissible to provide in the proximity of the upper face of the core an intermediate refractive index layer of refractive index intermediate between the refractive index of the upper clad layer and refractive index of the core, and to also provide in the lower clad layer in the proximity of the lower face of the core a low refractive index layer having a refractive index lower than reflective index of the lower clad layer (or a high refractive index layer having a refractive index higher than refractive index of the core).

FIG. 22 is a cross sectional diagram of an optical waveguide according to another embodiment of the present invention. A high stress region 41 of high internal tensile stress is formed in the lower clad layer 23 in the proximity of the lower face of the core 26 in an optical waveguide 40.

During the manufacture of this type of optical waveguide 40, a trapezoidal cross section-shaped core trench 25 which narrows in the downward direction in a lower clad layer 23 is produced by the stamping method using a core material and a clad material (resins) having comparatively high cure shrinkage. Thereafter the core material (resin) is poured into the core trench 25, the core 26 is formed by pressing a transparent plate from above, and the core material is cured in this state. Thereafter the upper clad layer 24 is formed upon the lower clad layer 23 to seal the core 26.

By production of the optical waveguide 40 in this manner, tensile stress occurs between the core 26 and the lower clad layer 23 due to the difference of the direction of cure shrinkage of the core 26 and direction of cure shrinkage of the lower clad layer 23, and a high stress region 41 is generated in the lower clad layer 23 in the proximity of the lower face of the core 26. At the high stress region 41 where relatively high tensile stress is generated, density of the resin (lower clad layer 23) drops due to tensile stress, and thus refractive index at the high stress region 41 in the proximity of the lower face of the core 26 becomes smaller than refractive index of the surrounding lower clad layer 23. For example, generation of a tensile stress of 10 MPa can be thought of as causing a change of refractive index of about 0.1%. Thus the difference between equivalent refractive index of the core 26 and refractive index of the high stress region 41 becomes higher than the difference between equivalent refractive index of the core 26 and refractive index of the lower clad layer 23, confinement of light at the lower face side of the core 26 increases, and mode profile of light approaches symmetry.

FIG. 23 is drawn based on a simulation of the distribution of tensile stress generated at the perimeter of the core when the optical waveguide 40 is manufactured by the stamping method. Stress was determined at three stages (i.e. the time of molding of the lower clad layer 23 and the core trench 25, the time of molding of the core 26, and the time of molding of the upper clad layer 24), and these stresses where added together. Tensile stress at the upper face side within the core 26 became 0 MPa to 7 MPa, tensile stress within the core 26 became about 7 MPa, tensile stress in the region within most of the lower clad layer 23 became 5 MPa, and tensile stress at the lower face side of the core 26 became 7 MPa to over 10 MPa. Thus refractive index in the proximity of the lower face of the core 26 becomes smaller, and it becomes difficult for light to leak from the lower face of the core 26.

FIG. 24 is a schematic drawing of a transmission method of light according to one embodiment of the present invention. A light waveguide 40 is a splitter. The core 26 of the optical waveguide 40 has a Y-shaped branched structure having 1 input-side port and 2 output-side ports. A single optical fiber 61 is connected to the input-side port for optical connection to the core 26. Moreover, a pair of optical fibers 62 is connected in the same manner to the output-side ports. An illumination optical element 63 is connected to the tip face of the optical fiber 61 at the side opposite to the input port so that an optical connection is made with the optical fiber 61. Moreover, a pair of the light-receiving optical elements 64 are each connected respectively to a tip face of the optical fiber 62 at the side opposite to the output ports so that an optical connection is made with the optical fibers 62. Light emitted from the illumination optical element 63 enters the optical fiber 61 and passes through the interior thereof. Light output from the opposite tip face of the optical fiber 61 enters the input-side port of the core 26 of the optical waveguide 40, is transmitted through the interior of the core 26, is divided into 2 parts, and exits from the output-side ports. The light exiting from the output-side ports of the core 26 enters the optical fibers 62 and is transmitted through the interiors thereof. The light exiting from the optical fibers 62 is received by the light-reception elements 64.

Since the cross-sectional shapes of the cores of the optical fibers 61 and 62 are circular, mode profile of the light transmitted through the interiors of the optical fibers 61 and 62 is symmetrical. Within the core 26 of the optical waveguide 40, the high stress region 41 is generated in the lower clad layer 23 in the proximity of the lower face of the core 26. Thus the difference between effective refractive index of the core 26 and refractive index of the high stress region 41 becomes larger than the difference between effective refractive index of the core 26 and refractive index of the lower clad layer 23, and confinement of light at the lower face side of the core 26 increases. Thus the mode profile of light transmitted through the interior of the core 26 becomes symmetrical. Thus no connection loss is generated between the core 26 and the optical fibers 61 and 62 for the light output from the illumination optical element 63, and it becomes possible for the light to be received at the light-reception optical element 64 side.

Furthermore, although the optical waveguide 40 of the present embodiment is a splitter, the present invention is not restricted this case, and a similar effect will occur for other devices such as an optical add-drop multiplexer, optical transceiver, optical switch, and the like. Moreover, optical waveguides are also included which have a refractive index adjustment region formed by other methods. Furthermore, although the optical fibers 61 and 62, the illumination optical element 63, and the light-reception optical element 64 are directly connected, the present invention is not restricted to this case. The present invention also includes the case of indirect connection by insertion of another optical waveguide or an optical amp between the optical fibers 61 and 62, the illumination optical element 63, and the light-reception optical element 64.

Although the embodiments of the present invention were explained using a core of trapezoidal cross-sectional shape, the present invention is not restricted to this case. For example, application is possible for all optical waveguides having a core having a cross-sectional shape such that width monotonically increases or decreases in the height direction or the depth direction (e.g. hemispherical and the like).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical waveguide comprising:

a clad layer; and a core buried within the clad layer and wherein the core has a refractive index higher than a refractive index of the clad layer, wherein, as viewed in a cross section perpendicular to the direction of propagation of light, a width of the core gradually increases or decreases with a distance from a surface of the clad layer, wherein, in a proximity of an interface between the clad layer and a face of a narrower width of the core, a refractive index adjustment region is disposed, the refractive index adjustment region having a refractive index higher than the refractive index of the core or lower than the refractive index of the clad layer, and wherein the refractive index adjustment region is a region formed by modifying a material of the clad layer or the core.

2. An optical waveguide comprising:
a clad layer; and
a core buried within the clad layer and wherein the core has a refractive index higher than a refractive index of the clad layer,
wherein, as viewed in a cross section perpendicular to the direction of propagation of light, a width of the core gradually increases or decreases with a distance from a surface of the clad layer,
wherein, in a proximity of an interface between the clad layer and a face of a narrower width of the core, a refractive index adjustment region is disposed, the refractive index adjustment region having a refractive index higher than the refractive index of the core or lower than the refractive index of the clad layer, and
wherein the refractive index adjustment region is formed by deposition at an interface between the core and the clad layer of a material different from materials of the core and the clad layer.

3. An optical waveguide comprising:
a clad layer, and
a core buried within the clad layer and wherein the core has a refractive index higher than a refractive index of the clad layer,
wherein, as viewed in a cross section perpendicular to the direction of propagation of light, a width of the core gradually increases or decreases with distance from a surface of the clad layer,
wherein, in a proximity of an interface between the clad layer and a face of a narrower width of the core, a refractive index adjustment region is disposed, the refractive index adjustment region having a refractive index higher than the refractive index of the core or lower than the refractive index of the clad layer, and
wherein the refractive index adjustment region has a higher tensile stress than the clad layer.

4. An optical waveguide comprising:
a lower clad layer;
an upper clad layer having a surface in contact with the lower clad layer; and
a core buried between the upper clad layer and the lower clad layer,
wherein, as viewed in a cross section perpendicular to the direction of propagation of light, width of the core gradually increases or decreases with distance from a surface of one of the clad layers, and
wherein, in proximity of an interface between a wide face of the core and the clad layer contacting the wide face of the core, a refractive index adjustment region is disposed, the refractive index adjustment region having a refractive index lower than the refractive index of the core and larger than the refractive index of the clad layer contacting a narrow face of the core.

5. The optical waveguide according to claim 4, wherein the refractive index adjustment region is formed by material-modification of the core or the clad layer contacting the wide face of the core.

6. The optical waveguide according to claim 4, wherein the refractive index adjustment region is an entire side of either the upper clad layer or the lower clad layer which contacts the wide face of the core.

7. The optical waveguide according to claim 4, wherein the region of low refractive index is formed by deposition at the interface between either the upper clad layer or the lower clad layer and the core of a material different from that of the core and the clad layer.

8. An optical transmission method comprising the steps of:
irradiating light from a light transmission means;
transmitting the light within a first optical fiber;
irradiating the light from the first optical fiber incident to a core of an optical waveguide;
transmitting the light through the core of the optical waveguide;
irradiating the light from the optical waveguide incident to and through a second optical fiber; and
receiving the light at a light receiving means,
wherein the optical waveguide comprises a clad layer, a core buried within the clad layer wherein the core has a refractive index higher than a refractive index of the clad layer, and
wherein, as viewed in cross section perpendicular to the direction of propagation of light, width of the core gradually increases or decreases with distance from a surface of the clad layer, and in proximity of an interface between the clad layer and the face of narrower width of the core, a refractive index adjustment region is disposed, the refractive index adjustment region having a refractive index higher than the refractive index of the core or lower than the refractive index of the clad layer.

* * * * *